US006904163B1

(12) United States Patent
Fujimura et al.

(10) Patent No.: US 6,904,163 B1
(45) Date of Patent: Jun. 7, 2005

(54) TOMOGRAPHIC IMAGE READING METHOD, AUTOMATIC ALIGNMENT METHOD, APPARATUS AND COMPUTER READABLE MEDIUM

(75) Inventors: Kaori Fujimura, Yokosuka (JP); Kiyotaka Otsuji, Kamakura (JP); Yuichi Fujino, Kiyose (JP); Sakuichi Ohtsuka, Yokohama (JP); Koji Ogawa, Yokohama (JP); Hitomi Sato, Yokosuka (JP); Harumi Kawashima, Yokosuka (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 09/528,253

(22) Filed: Mar. 17, 2000

(30) Foreign Application Priority Data

| Mar. 19, 1999 | (JP) | 11-075499 |
| Mar. 25, 1999 | (JP) | 11-081743 |
| Jul. 12, 1999 | (JP) | 11-196955 |
| Mar. 16, 2000 | (JP) | 2000-074098 |

(51) Int. Cl.⁷ .............................. G06K 9/00; G06K 9/32; H05G 1/28
(52) U.S. Cl. .................. 382/131; 382/130; 382/132; 382/294; 378/162; 378/163; 378/164
(58) Field of Search ......................... 382/130–132, 382/294; 378/162–164; 383/131

(56) References Cited

U.S. PATENT DOCUMENTS

| 5,359,513 A | * | 10/1994 | Kano et al. ............ 382/128 |
| 5,368,033 A | * | 11/1994 | Moshfeghi ............ 600/419 |
| 5,633,951 A | * | 5/1997 | Moshfeghi ............ 382/154 |
| 5,841,148 A | * | 11/1998 | Some et al. ............ 250/584 |
| 5,862,249 A | * | 1/1999 | Jang et al. ............ 382/132 |
| 6,023,635 A | * | 2/2000 | Liu et al. ............ 600/410 |
| 6,067,373 A | * | 5/2000 | Ishida et al. ............ 382/130 |
| 6,127,669 A | * | 10/2000 | Sidiropoulos et al. ... 250/208.1 |
| 6,266,453 B1 | * | 7/2001 | Hibbard et al. ............ 382/294 |
| 6,290,648 B1 | * | 9/2001 | Kamiyama ............ 600/443 |
| 6,363,163 B1 | * | 3/2002 | Xu et al. ............ 382/130 |

FOREIGN PATENT DOCUMENTS

JP 11-250263 9/1999

OTHER PUBLICATIONS

Ukai et al., Comparative Interpretation of Radiogram by CT Images for Mass Examination, Dept. of Optical Science, Univ. of Tokushima, JAMIT Frontier '98, pp. 140–145.

* cited by examiner

Primary Examiner—Andrew W. Johns
Assistant Examiner—Hussein Akhavannik
(74) Attorney, Agent, or Firm—Kenyon & Kenyon

(57) ABSTRACT

A tomographic image reading method for extracting a comparison image corresponding to a diagnostic image, the diagnostic image being one of first tomographic images, the comparison image being one of second tomographic images, the method including the steps of: inputting the first images and the second images; generating a first projection image from the first images and a second projection image from the second images; measuring shift amount between the first projection image and the second projection image by using a template; correcting the slice position according to the shift amount; and displaying the diagnostic image and the comparison image to a monitor.

90 Claims, 19 Drawing Sheets

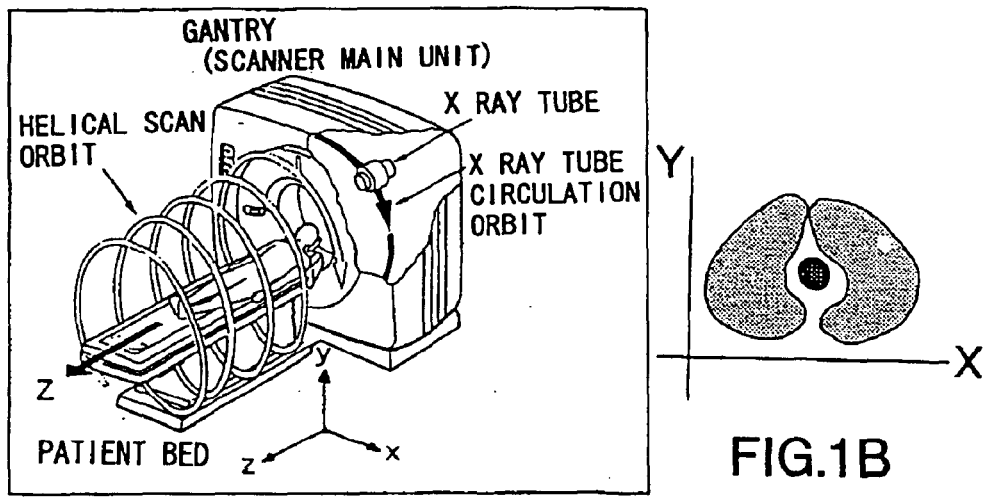
FIG.1A
FIG.1B
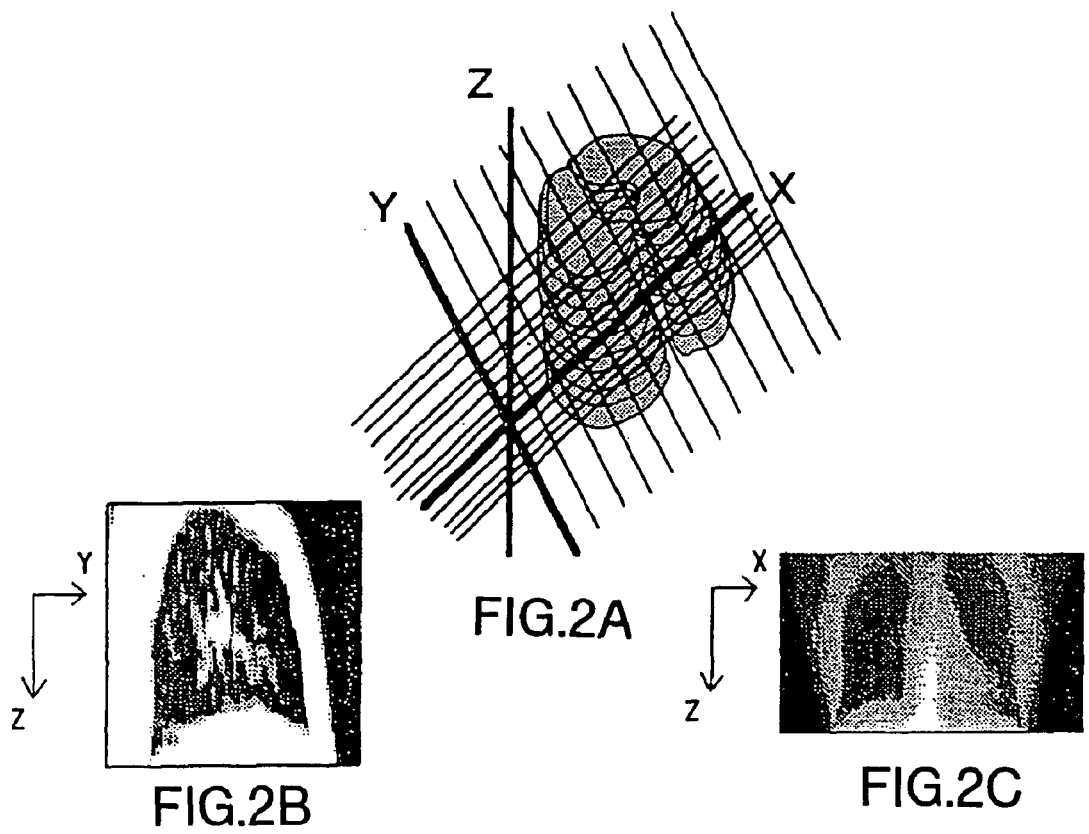
FIG.2A
FIG.2B
FIG.2C

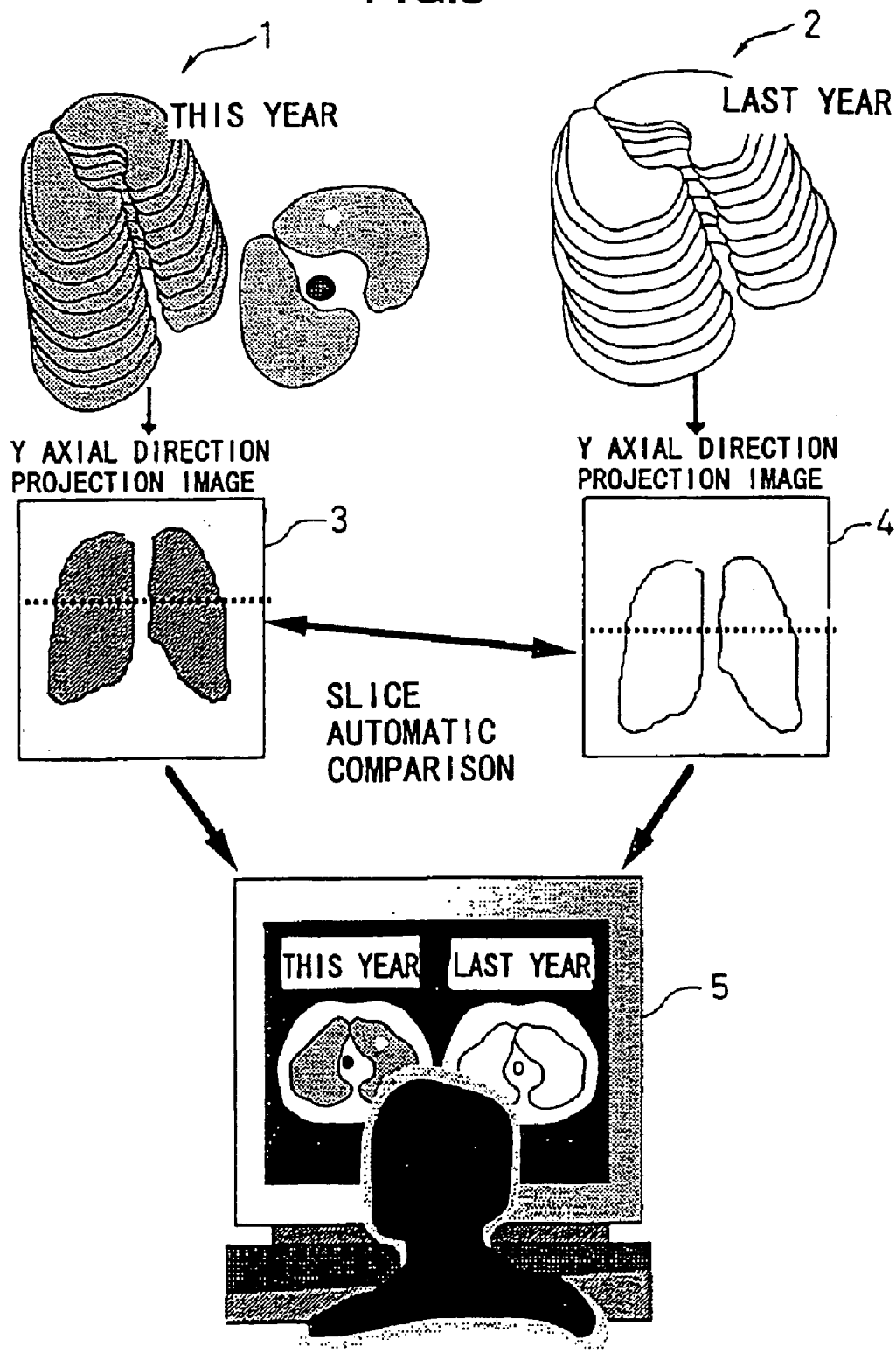

FIG.19

| SLIDER POSITION | Ch | VALUE |
|---|---|---|
| 124 | 1 | 62 |
| 125 | 2 | 62 |
| 126 | 1 | 63 |
| 127 | 2 | 63 |
| 128 | 1 | 64 |
| 129 | 2 | 64 |
| 130 | 1 | 65 |
| 131 | 2 | 65 |
| 132 | 1 | 66 |
| 133 | 2 | 66 |
| 134 | 1 | 67 |
| 135 | 2 | 67 |
| 136 | 1 | 68 |
| 137 | 2 | 68 |
| 138 | 1 | 69 |
| 139 | 2 | 69 |
| 140 | 1 | 70 |
| 141 | 2 | 70 |
| 142 | 1 | 71 |
| 143 | 2 | 71 |

TOMOGRAPHIC IMAGE READING METHOD, AUTOMATIC ALIGNMENT METHOD, APPARATUS AND COMPUTER READABLE MEDIUM

BACKGROUND OF THE INVENTION

1. Field of the Invention

The present invention generally relates to a slice image automatic alignment method and apparatus used for comparing a tomographic image of an object such as a computerized tomography (CT) image with another tomographic image of the same object which are taken at different times. The tomographic image is generated by CT, MRI(magnetic resonance imaging) or the like.

2. Description of the Related Art

In a medical field, comparison between a present image and a previous image provides a clue for determining whether a shade in an image is a tumor or not and whether it is malignant or not. As one method for the comparison of images, when a doctor finds a suspicious shade in a diagnostic image, the doctor may search for comparison images showing a position which corresponds to that of the diagnostic image so as to compare the images. The technique for supporting the doctor to compare images is disclosed in, for example, "METHOD FOR AUTOMATICALLY COMPARING SLICED IMAGES OF CHEST THREE-DIMENSIONAL TOMOGRAPHIC IMAGES", Japanese laid-open patent application No. 10-53172 and "COMPARATIVE INTERPRETATION OF RADIOGRAM BY CT IMAGE FOR MASS EXAMINATION", Ukai et al., JAMIT Frontier '98, pp140–145.

The above-mentioned technique in "METHOD FOR AUTOMATICALLY COMPARING SLICED IMAGES OF CHEST THREE-DIMENSIONAL TOMOGRAPHIC IMAGES" is a method for comparing each slice of the diagnostic images with comparison image slices for finding a corresponding comparison image. Although the method can cope with changes of body condition and movement of the lower part of a lung for breathing, there is a problem that the process takes a long time since the slice needs to be compared with comparison image slices one by one. According to the above-mentioned conventional technique "COMPARATIVE INTERPRETATION OF RADIOGRAM BY CT IMAGE FOR MASS EXAMINATION", sections of a lung field are classified, then, features such as a lung field area, a heart area, and a descending aorta are extracted and automatic image comparison is performed on the basis of the location of the features. However, there is a problem that it takes a long time to extract the features.

Accordingly, when a doctor carries out diagnosis by comparing chest tomographic images, it a takes time to see a comparison image which corresponds to the diagnostic image, or it is necessary to compare present images with previous images. In this case, since all images need to be compared, normal images as well as suspicious images need to be compared. Therefore, it takes time to perform often useless comparisons.

SUMMARY OF THE INVENTION

It is an object of the present invention to provide a tomographic image reading method, an automatic alignment method, the apparatus and the computer readable medium in which slice images of the same body position can be obtained automatically at high speed from two sequences of chest tomographic images of the same person such that the slice images can be presented to a doctor in a short time.

The above object of the present invention is achieved by a tomographic image reading method for extracting a comparison image corresponding to a diagnostic image and displaying the images, the diagnostic image being a slice image which is one of first tomographic images, the comparison image being a slice image which is one of second tomographic images which are taken at a time different from the time when the first tomographic images are taken, body section being a slice plane in the X-Y axial direction and body axis being in the Z axial direction, the method comprising the steps of:

inputting the first tomographic images and the second tomographic images;

generating a first projection image from the first tomographic images and a second projection image from the second tomographic images:

measuring shift amount between the first projection image and the second projection image by searching the second projection image for the same area using a template, the template being generated from the first projection image such that the template includes an area in which a specific object image exists;

correcting the slice position according to the shift amount between the first projection image and the second projection image; and displaying the diagnostic image and the comparison image at a corrected slice position to a monitor.

According to the above-mentioned method for aligning positions of diagnostic images and comparison images so as to extract a comparison image corresponding to a diagnostic image, since the projection image is used, the shift can be detected quickly, and a diagnostic image and a comparison image in which slice position shift is corrected can be displayed on a monitor in a short time.

The above object of the present invention is also achieved by an image alignment method for extracting a comparison image corresponding to a diagnostic image and displaying the images, the diagnostic image being a slice image which is one of first tomographic images, the comparison image being a slice image which is one of second tomographic images which are taken at a time different from the time when the first tomographic images are taken, body section being a slice plane in the X-Y axial direction and body axis being in the Z axial direction, the method comprising the steps of:

inputting the first tomographic images and the second tomographic images;

aligning resolutions of the first tomographic images and the second tomographic images by scaling one or both of the tomographic images when the resolutions of the first tomographic images and the second tomographic images are different;

generating a first projection image from the first tomographic images and a second projection image from the second tomographic images;

measuring shift amount between the first projection image and the second projection image by searching the second projection image for the same area using a template by performing pattern matching while shifting the template by an interval, the template being generated from the first projection image such that the template includes an area in which a specific object image exists;

correcting the slice position according to the shift amount between the first projection image and the second projection image; and displaying the diagnostic image and the comparison image at a corrected slice position on a monitor.

The image alignment method may include an adjusting step of adjusting positions of the diagnostic image and the comparison image which are displayed;

wherein a MIDI signal constructing method is used for the adjusting step, the MIDI signal constructing method comprising the steps of:

providing n different MIDI channels or control numbers or combinations of them for a signal x which has 128×n stages in which n is a positive integer;

assuming the MIDI channels or the control numbers or the combinations as p=1, 2, . . . n;

dividing the signal x into 128 parts $W(1)(1;0\leq1\leq127)$ in ascending order and assigning p which is equal to r+1 (r; $0\leq r<n$) to the signal x which is equal to 1×n+r;

constructing and sending a MIDI control change message in which a control value is 1 by using a MIDI channel or control number corresponding to p.

According to the above method, automatic position alignment can be performed at high speed and the result can be displayed. In addition, the displayed image can be adjusted precisely. That is, by using the MIDI signal constructing method for the terminal operation, the operation can be performed effectively.

The above object of the present invention is also achieved by a slice image automatic alignment method for extracting a comparison image corresponding to a diagnostic image, the diagnostic image being a slice image which is one of first tomographic images, the comparison image being a slice image which is one of second tomographic images which are taken at a time different from the time when the first tomographic images are taken, body section being a slice plane in the X-Y axial direction and body axis being in the Z axial direction, the method comprising the steps of:

inputting the first tomographic images and the second tomographic images;

aligning resolutions of the first tomographic images and the second tomographic images by scaling one or both of the tomographic images when the resolutions of the first tomographic images and the second tomographic images are different;

generating a first projection image from the first tomographic images and a second projection image from the second tomographic images;

measuring shift amount between the first projection image and the second projection image by searching the second projection image for the same area using a template by performing pattern matching while shifting the template by an interval, the template being generated from the first projection image such that the template includes an area in which a specific object image exists; and correcting the slice position according to the shift amount between the first projection image and the second projection image.

The step of generating projection images may include the step of:

generating the projection image comprising pixel values obtained by adding pixel values (for example. CT values, gray level, density value or the like) of the tomographic images in the X or Y axial direction or in any other direction.

According to the above mentioned method, the shift can be detected quickly. By correcting the shift in the comparison images, automatic aligning for slice images can be performed quickly.

The step of generating projection images may include the step of:

generating a two dimensional image sequence comprising pixel values obtained by adding pixel values of the tomographic images in the X or Y axial direction or in any other direction; and generating the projection image by interpolating the two dimensional image sequence.

According to the method, the position of slice images can be aligned accurately.

In the above-mentioned method, the template may be an area of 25% to 50% from the top end of the first projection image in the Z axial direction. Accordingly, pattern matching can be performed effectively. Especially, when the object part is lung, the effect is remarkable.

The above object of the present invention is also achieved by a slice image automatic alignment method for extracting a comparison image corresponding to a diagnostic image, the diagnostic image being a slice image which is one of first tomographic images, the comparison image being a slice image which is one of second tomographic images which are taken at the time different from the time when the first tomographic images are taken, body section being a slice plane in the X-Y axial direction and body axis being in the Z axial direction, the method comprising the steps of:

inputting the first tomographic images and the second tomographic images;

aligning resolutions of the first tomographic images and the second tomographic images by scaling one or both of the tomographic images when the resolutions of the first tomographic images and the second tomographic images are different;

finding a reference position in the Y axial direction for each of the first tomographic images and the second tomographic images and correcting shift in the Y axial direction on the basis of the reference position;

generating a first projection image in the X axial direction from the first tomographic images and generating a second projection image in the X axial direction from the second tomographic images;

measuring shift amount between the first projection image and the second projection image by searching the second projection image for the same area as a template by performing pattern matching while shifting the template by an interval, the template being generated from the first projection image such that the template includes an area in which a specific object image exists; and correcting the slice position according to the shift amount between the first projection image and the second projection image.

The above object of the present invention is also achieved by a slice image automatic alignment method for extracting a comparison image corresponding to a diagnostic image, the diagnostic image being a slice image which is one of first tomographic images, the comparison image being a slice image which is one of second tomographic images which are taken at the time different from the time when the first tomographic images are taken, body section being a slice plane in the X-Y axial direction and body axis being in the Z axial direction, the method comprising the steps of:

inputting the first tomographic images and the second tomographic images;

aligning resolutions of the first tomographic images and the second tomographic images by scaling one or both of the tomographic images when the resolutions of the first tomographic images and the second tomographic images are different;

generating a first projection image in the X axial direction from the first tomographic images and generating a second projection image in the X axial direction from the second tomographic images;

finding a reference position in the Y axial direction from each of the first projection image and the second projection image and correcting shift in the Y axial direction on the basis of the reference position;

measuring shift amount between the first projection image and the second projection image by searching the second projection image for the same area using a template by performing pattern matching while shifting the template by an interval, the template being generated from the first projection image such that the template includes an area in which a specific object image exists; and correcting the slice position according to the shift amount between the first projection image and the second projection image.

In the above-mentioned method, the step of generating projection images may include the step of:

generating a two dimensional image sequence comprising pixel values obtained by adding pixel values of the tomographic images in the X axial direction; and generating the projection image by interpolating the two dimensional image sequence.

The step of finding the reference position and correcting shift may include the steps of:

extracting a bed area as the reference position from the first tomographic image and the second tomographic image or the first projection image and the second projection image;

correcting shift in the Y axial direction on the basis of the bed surface, the Y axial direction being perpendicular to the bed surface.

In addition, the step of finding the reference position and correcting shift may include the steps of:

finding a body part which contacts the bed as the reference position from the first tomographic image and the second tomographic image or the first projection image and the second projection image;

correcting shift in the Y axial direction on the basis of the part, the Y axial direction being perpendicular to the part.

Further, the step of finding the reference position and correcting shift may include the steps of:

finding a backbone part as the reference position from the first tomographic image and the second tomographic image or the first projection image and the second projection image;

correcting shift in the Y axial direction on the basis of the backbone part, the Y axial direction being perpendicular to the backbone part.

According to the above mentioned methods, the shift can be detected quickly. By correcting the shift in the comparison images, automatic aligning of slice images can be performed quickly. In addition, since shift correcting is performed by using the bed position or a distinctive part of the body as a reference, search area can be decreased. Therefore, calculation amount can be decreased.

In the above mentioned invention, the step of generating projection images may include the step of generating the projection image in which weight is assigned to a specific observation object by setting a window level and a window width.

According to the method, better matching results for a specific part such as bone or lung tissue and speedy processing can be realized.

Further, the step of generating projection images may includes the step of generating the projection image in which only a part including a distinctive part is projected.

According to the method, the area of the projection image or the search area can be narrowed. Therefore, better matching results for a specific part and speedy processing can be realized.

Further, the step of measuring the shift amount may include the steps of:

generating a plurality of templates;

performing template matching on the second projection image by using a plurality of templates; and measuring shift amount between the first projection image and the second projection image from a plurality of reference points.

According to the method, shift correction of the slice position becomes more accurate and the better matching result can be obtained. Especially, when comparing the lower part of lung, shift due to breathing can be corrected.

The above object of the present invention is also achieved by a tomographic image reading apparatus for extracting a comparison image corresponding to a diagnostic image and displaying the images, the diagnostic image being a slice image which is one of first tomographic images, the comparison image being a slice image which is one of second tomographic images which are taken at the time different from the time when the first tomographic images are taken, body section being a slice plane in the X-Y axial direction and body axis being in the Z axial direction, the apparatus comprising:

inputting means for inputting the first tomographic images and the second tomographic images;

projection image generation means for generating a first projection image from the first tomographic images and a second projection image from the second tomographic images;

template generation means for generating a template from the first projection image such that the template includes an area in which a specific object image exists;

matching means for measuring shift amount between the first projection image and the second projection image by searching the second projection image for the same area as the template;

slice position correcting means for correcting the slice position according to the shift amount between the first projection image and the second projection image; and displaying means for displaying the diagnostic image and the comparison image at a corrected slice position on a monitor.

According to the invention, since the projection image is used, the shift can be detected quickly and a diagnostic image and a comparison image in which slice position shift is corrected can be displayed on a monitor in a short time.

The above object of the present invention is also achieved by an image alignment apparatus for extracting a comparison image corresponding to a diagnostic image and displaying the images, the diagnostic image being a slice image which is one of first tomographic images, the comparison image being a slice image which is one of second tomographic images which are taken at a time different from the time when the first tomographic images are taken, body section being a slice plane in the X-Y axial direction and body axis being in the Z axial direction, the apparatus comprising:

inputting means for inputting the first tomographic images and the second tomographic images;

resolution aligning means for aligning resolutions of the first tomographic images and the second tomographic images by scaling one or both of the tomographic images when the resolutions of the first tomographic images and the second tomographic images are different;

projection image generation means for generating a first projection image from the first tomographic images and a second projection image from the second tomographic images;

template generation means for generating a template from the first projection image such that the template includes an area in which a specific object image exists;

matching means for measuring shift amount between the first projection image and the second projection image by searching the second projection image for the same area as the template by performing pattern matching while shifting the template by an interval;

slice position correcting means for correcting the slice position according to the shift amount between the first projection image and the second projection image; and displaying means for displaying the diagnostic image and the comparison image at a corrected slice position on a monitor.

The above object of the present invention is also achieved by a slice image automatic alignment apparatus for extracting a comparison image corresponding to a diagnostic image, the diagnostic image being a slice image which is one of first tomographic images, the comparison image being a slice image which is one of second tomographic images which are taken at the time different from the time when the first tomographic images are taken, body section being a slice plane in the X-Y axial direction and body axis being in the Z axial direction, the apparatus comprising:

inputting means for inputting the first tomographic images and the second tomographic images;

resolution aligning means for aligning resolutions of the first tomographic images and the second tomographic images by scaling one or both of the tomographic images when the resolutions of the first tomographic images and the second tomographic images are different;

projection image generation means for generating a first projection image from the first tomographic images and a second projection image from the second tomographic images;

template generation means for generating a template from the first projection image such that the template includes an area in which a specific object image exists;

matching means for measuring shift amount between the first projection image and the second projection image by searching the second projection image for the same area as the template by performing pattern matching while shifting the template by an interval; and slice position correcting means for correcting the slice position according to the shift amount between the first projection image and the second projection image.

According to the above mentioned apparatus, the shift can be detected quickly. By correcting the shift in the comparison images, automatic aligning for slice images can be performed quickly.

The above object of the present invention is also achieved by a slice image automatic alignment apparatus for extracting a comparison image corresponding to a diagnostic image, the diagnostic image being a slice image which is one of first tomographic images, the comparison image being a slice image which is one of second tomographic images which are taken at a time different from the time when the first tomographic images are taken, body section being a slice plane in the X-Y axial direction and body axis being in the Z axial direction, the apparatus comprising:

inputting means for inputting the first tomographic images and the second tomographic images;

resolution aligning means for aligning resolutions of the first tomographic images and the second tomographic images by scaling one or both of the tomographic images when the resolutions of the first tomographic images and the second tomographic images are different;

reference position recognition means for finding a reference position in the Y axial direction from each of the first tomographic image and the second tomographic image;

shift correcting means for correcting shift in the Y axial direction on the basis of the reference position;

projection image generation means for generating a first projection image of the X axial direction from the first tomographic images and generating a second projection image of the X axial direction from the second tomographic images;

template generation means for generating a template from the first projection image such that the template includes an area in which a specific object image exists;

matching means for measuring shift amount between the first projection image and the second projection image by searching the second projection image for the same area as the template by performing pattern matching while shifting the template by an interval; and slice position correcting means for correcting the slice position according to the shift amount between the first projection image and the second projection image.

The above object of the present invention is also achieved by a slice image automatic alignment apparatus for extracting a comparison image corresponding to a diagnostic image, the diagnostic image being a slice image which is one of first tomographic images, the comparison image being a slice image which is one of second tomographic images which are taken at a time different from the time when the first tomographic images are taken, body section being a slice plane in the X-Y axial direction and body axis being in the Z axial direction, the apparatus comprising:

inputting means for inputting the first tomographic images and the second tomographic images;

resolution aligning means for aligning resolutions of the first tomographic images and the second tomographic images by scaling one or both of the tomographic images when the resolutions of the first tomographic images and the second tomographic images are different;

projection image generation means for generating a first projection image of the X axial direction from the first tomographic images and generating a second projection image of the X axial direction from the second tomographic images;

reference position recognition means for finding a reference position in the Y axial direction from each of the first projection image and the second projection image;

shift correcting means for correcting shift in the Y axial direction on the basis of the reference position;

template generation means for generating a template from the first projection image such that the template includes an area in which a specific object image exists;

matching means for measuring shift amount between the first projection image and the second projection image by searching the second projection image for the same area as the template by performing pattern matching while shifting the template by an interval; and slice position correcting means for correcting the slice position according to the shift amount between the first projection image and the second projection image.

According to the above mentioned apparatuses, the shift can be detected quickly. By correcting the shift in the comparison images, automatic aligning for slice images can be performed quickly. In addition, since shift correcting is performed by using the bed position or a distinctive part of the body as a reference, search area can be narrowed. Therefore, calculation amount can be decreased.

In addition, the present invention is a computer readable medium storing program for causing a computer to perform processes according to the method of the present invention.

According to the computer readable medium, a program of the present invention can be stored or distributed. In addition, it becomes easy to realize the present invention by using a computer.

BRIEF DESCRIPTION OF THE DRAWINGS

Other objects, features and advantages of the present invention will become more apparent from the following detailed description when read in conjunction with the accompanying drawings, in which:

FIGS. 1A and 1B are diagrams for explaining X, Y, and Z axes in a chest CT image according to an embodiment of the present invention;

FIG. 2A is a diagram for explaining projection directions according to a first embodiment of the present invention;

FIGS. 2B and 2C are diagrams showing examples of a projection image;

FIG. 3 is a schematic diagram showing a configuration example of a chest CT image alignment apparatus according to the first embodiment:

FIG. 19 shows relations between a slider position, a channel and a value;

DETAILED DESCRIPTION OF THE PREFERRED EMBODIMENTS

Figure 4:
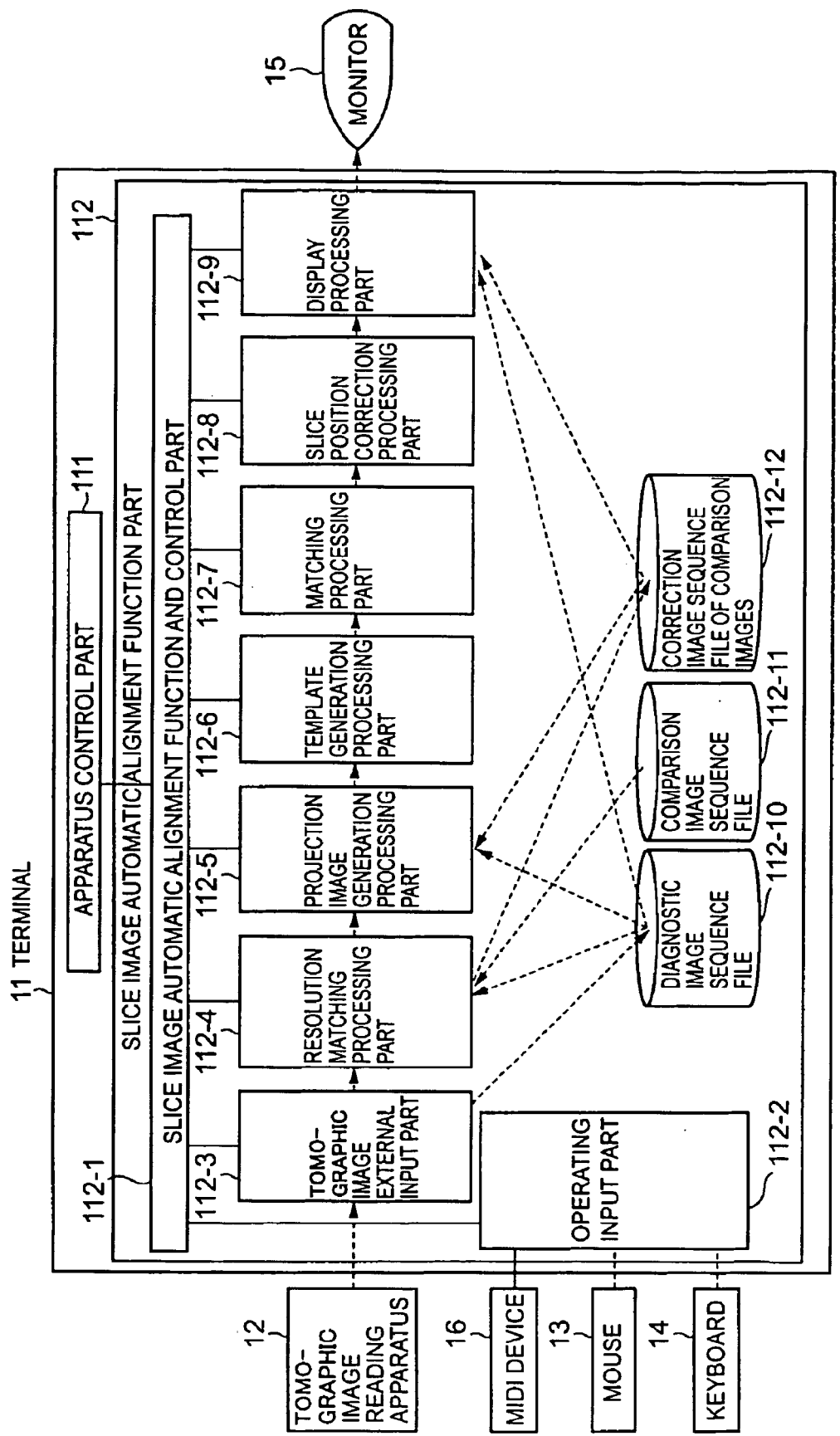
FIG. 4 is a block diagram showing another configuration example of the chest CT image alignment apparatus according to the first embodiment.

In the following embodiments of the present invention will be described with reference to figures.

In the following embodiments, concerning chest X ray CT images for lung cancer screening, present images are compared with previous images.

First Embodiment

The first embodiment of the present invention will be described.

FIGS. 1A and 1B are diagrams for explaining X, Y, and Z axes in the chest CT image. Assume that the X-Y axial direction forms a slice plane of a tomographic of body such as chest or the like as shown in FIG. 1B, and that the Z axial direction is a moving direction of a patient bed as shown in FIG. 1A. The chest X ray CT images for lung cancer screening are taken by a helical scan CT shown in FIG. 1A and information of slice thickness in the Z axial direction is included in a slice image of chest tomographic of X-Y axial direction. The number of images to be taken is from 25 to 30 for one person.

FIGS. 2B and 2C are diagrams showing examples of a projection image. FIG. 2A shows the direction of projection. FIG. 2B is a projection image in which all CT values, which are gray levels, are added in the X axial direction as shown in FIG. 2A. FIG. 2C is a projection image in which all CT values, which are gray levels, are added in the Y axial direction shown in FIG. 2A. In this embodiment, the projection image of the Y axial direction as an example will be used.

FIG. 3 is a schematic diagram showing a configuration example of a chest CT image alignment apparatus according to the embodiment.

A reference number 1 shows a file storing chest tomographic images (diagnostic images) taken this year and a reference number 2 shows a file storing chest tomographic images (diagnostic images) taken last year. A reference number 3 shows a projection image generated by the file 1 and a reference number 4 shows a projection image generated by the file 2. In the sequence of CT images stored in the files 1, 2, position shift between past images and present images is occurred due to differences of subject positions or by deformation of lung due to breathing. A reference number 5 shows a computer system for automatically aligning position of slice images of the file 1 with position of slice images of the file 2 and displaying slice images at a position obtained by the alignment.

FIG. 4 is a block diagram showing another configuration example of the chest CT image alignment apparatus according to the embodiment.

The chest CT image alignment apparatus includes a terminal apparatus 11 to which a tomographic image reading apparatus 12, a mouse 13, a keyboard 14, and a monitor 15 are connected. The terminal apparatus 11 includes an apparatus control part 111 and a slice image automatic alignment function part 112 for tomographic images. The slice image automatic alignment function part 112 for tomographic images includes a slice image automatic alignment function and control part 112-1 for tomographic images, a diagnostic image sequence file 112-10, a comparison image sequence file 112-11 and a correction image sequence file 112-12 of comparison images. An operating input part 112-2, a tomographic image external input part 112-3, a resolution matching processing part 112-4, a projection image generation processing part 112-5, a template generation processing part 112-6, a matching processing part 112-7, a slice position correction processing part 112-8, and a display processing part 112-9 are connected to the slice image automatic alignment function and control part 112-1 for tomographic images. The operating input part 112-2 performs data input by connecting the mouse 13 and the keyboard 14. The tomographic image external input part 112-3 inputs tomographic images from the tomographic image reading apparatus 12. The display processing part 112-9 displays diagnostic images and comparison images to the monitor 15.

The tomographic image external input part 112-3 writes data to the diagnostic image sequence file 112-10. The resolution matching processing part 112-4 reads data from the diagnostic image sequence file 112-10 and the comparison image sequence file 112-11. In addition, the resolution matching processing part 112-4 writes to the correction image sequence file 112-12 of comparison images. The projection image generation processing part 112-5 and the display processing part 112-9 read data from the diagnostic image sequence file 112-10 and the correction image sequence file 112-12 of comparison images.

A MIDI device 16 such as a pedal, a dial, and a slider is connected to the operating input part 112-2. Using the MIDI device, it is possible to adjust the position of the Z axial direction of tomographic images displayed on the monitor minutely. The detailed description of the MIDI device will be given later.

Figure 5:
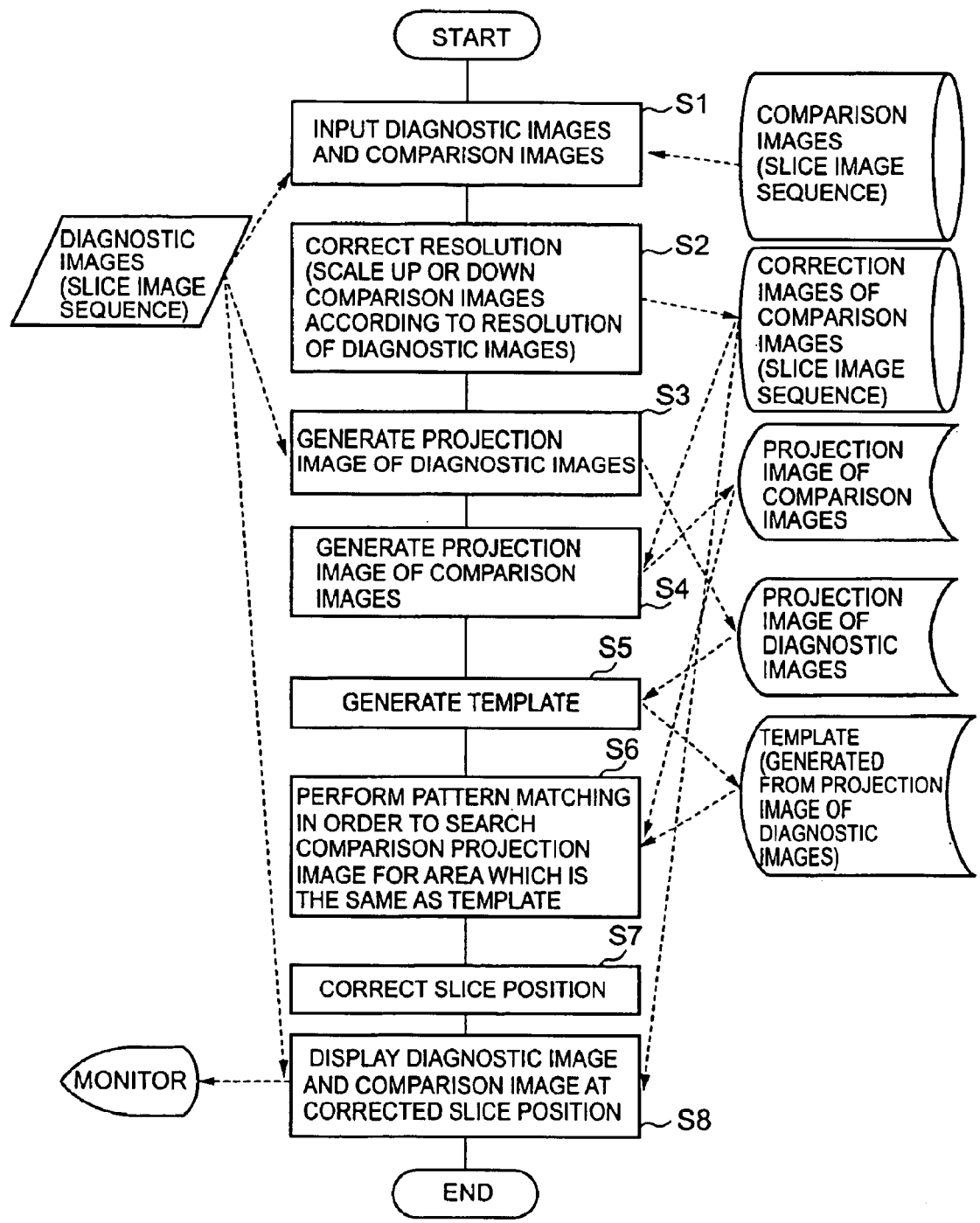
FIG. 5 is a flowchart showing a procedure for measuring position shift and displaying the diagnostic image and the comparison image of the same position according to the first embodiment.

FIG. 5 is a flowchart showing a procedure for measuring position shift and displaying the diagnostic image and the comparison image at the same position in order to support image comparison by software in the computer shown in FIG. 3 or by each processing part of the image alignment apparatus shown in FIG. 4. In the flowchart, parenthesized processing parts, which are included in the image alignment apparatus in FIG. 4, corresponding to the following procedure are shown. The flowchart will be described.

In FIG. 5, diagnostic image sequence $f_Z(x, y)$ which is a slice image sequence and comparison image sequence $g_Z(x, y)$ which is also a slice image sequence are input in step 1 (tomographic image external input part 112-3).

In step 2, when resolution of the diagnostic images and resolution of the comparison images are different, resolution matching processing is performed for correcting the comparison images such that the resolution of the comparison images agree with that of the diagnostic images by scaling using three-dimensional interoperation or leaner interpolation (resolution matching processing part 112-4).

Next, in step 3, projection images for each images of the diagnostic images and the comparison images are generated (projection image generation processing part 112-5).

Figure 6:
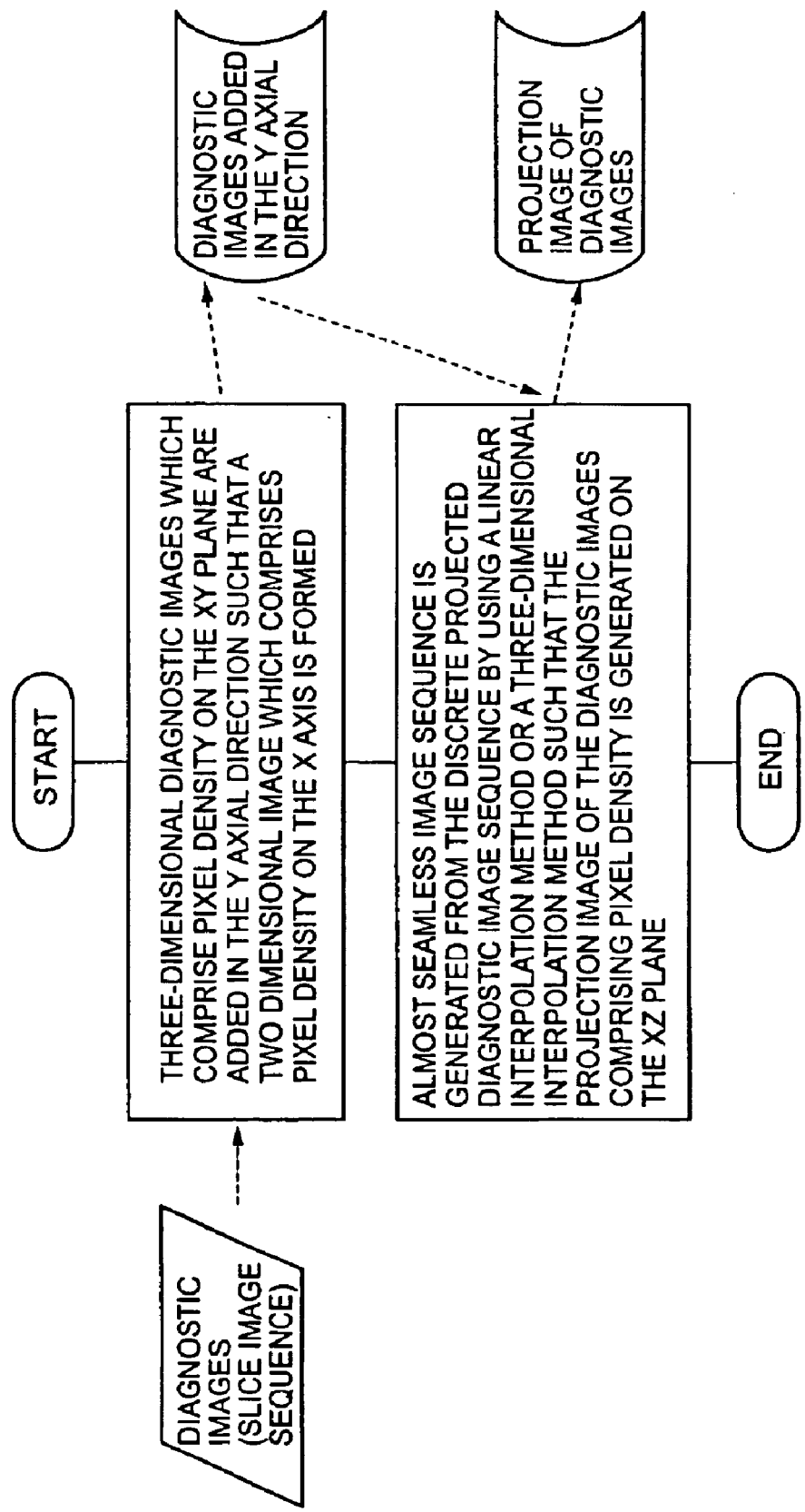
FIG. 6 is a flowchart showing generation process of the projection image of the diagnostic images according to the first embodiment.

FIG. 6 is a flowchart showing generation process of the projection image of the diagnostic images.

First, three-dimensional diagnostic images (slice image sequence) which comprise pixel density on the XY plane are added in the Y axial direction such that a two dimensional image which comprises pixel density on the X axis is formed. That is, assuming that the size of the slice image in the Y axial direction is YSIZE, the projection image $d_1(x, z)$ of the diagnostic images in the Z axial direction is calculated by adding values in the Y axial direction as shown in the following equation (1).

$$d_1(x, z) = (\Sigma_{y=0}^{YSIZE} f_Z(x, y))/YSIZE \qquad (1)$$

Then, an almost seamless image sequence is generated from the discrete projected diagnostic image sequence by using a leaner interpolation method or a three-dimensional interpolation method such that the projection image of the diagnostic images comprising pixel density is generated on the XZ plane. According to this processing, when computer processing is used, a completely continuous function can not be dealt with. Therefore, almost seamless images which are spaced at 1 mm intervals are generated from images spaced at Z axial direction (body axis direction) intervals of cm order. That is, when generating the projection image from the added image sequence, the Z axial direction is interpolated by the leaner interpolation method or the three-dimensional interpolation method. Concerning the interpolation methods, the leaner interpolation method is better from the point of view of processing speed. When performing interpolation by the three-dimensional interpolation method, the following equations (2) and (3) are used.

$$d(x_0, z_0) \equiv \sum_k \sum_l d(x_k, z_l)c(x_k - x_0)c(z_l - z_0) \qquad (2)$$

$$C(w) = \begin{cases} 1 - 2|w|^2 + |w|^3 & 0 \leq |w| < 1 \\ 4 - 8|w| + 5|w|^2 - |w|^3 & 1 \leq |w| < 2 \\ 0 & 2 \leq |w| \end{cases} \qquad (3)$$

Figure 7:
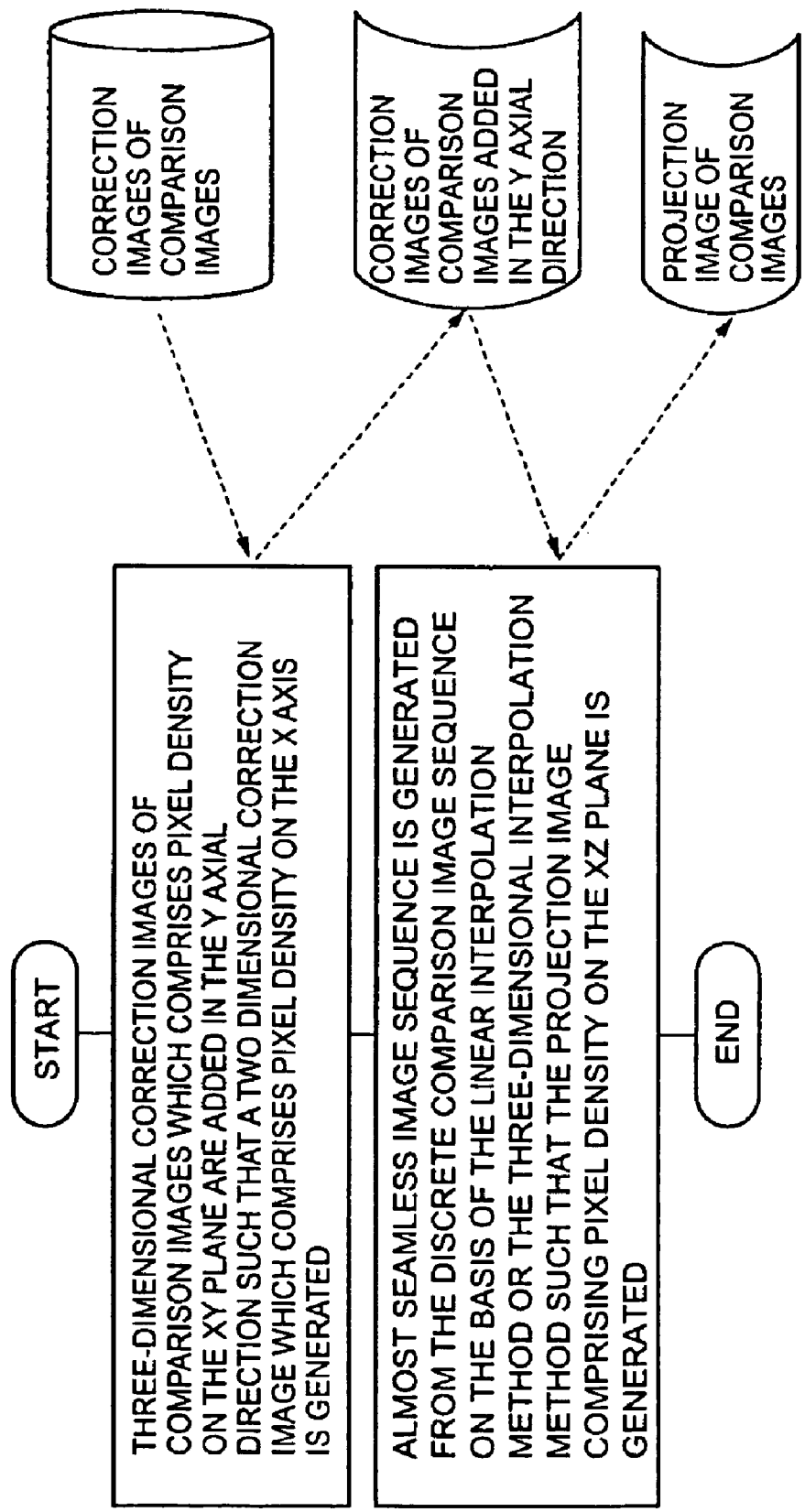
FIG. 7 is a flowchart showing generation process of the projection image of the comparison images according to the first embodiment.

Next, in step 4 in FIG. 5, a projection image of the comparison images is generated in the same way mentioned above. FIG. 7 shows the generation process.

First, three-dimensional correction images (comparison images on which resolution matching processing is performed) which comprises pixel density on the XY plane are added in the Y axial direction such that a two dimensional correction image which comprises pixel density on the X axis is generated. That is, assuming that the size of the slice image in the Y axial direction is YSIZE, the projection image sequence $d_1(x, z)$ in the Z axial direction is generated by adding values in the Y axial direction as shown in the following equation (4).

$$d_2(x, z) = (\Sigma_{y=0}^{YSIZE} g_Z(x, y)))/YSIZE \tag{4}$$

Then, an almost seamless image sequence is generated from the discrete comparison image sequence on the basis of the leaner interpolation method or the three-dimensional interpolation method such that the projection image comprising pixel density on the XZ plane is generated. Since computer processing is used, a completely continuous function can not be dealt with. Therefore, almost seamless images spaced at 1 mm intervals are generated from images spaced at Z axial direction intervals of cm order. That is, when generating the projection image from the added image sequence of the comparison images, interoperation is performed in the Z axial direction by the leaner interpolation method or the three-dimensional interpolation method since the resolution of the X axial direction and the resolution of the Z axial direction are different. Concerning the interpolation methods, the leaner interpolation method is better from the point of view of processing speed. When performing interpolation by the three-dimensional interpolation method, the above-mentioned equations (2) and (3) are used.

The interpolation methods in the Z axial direction are not limited to the leaner interpolation method and the three-dimensional interpolation method. A most neighborhood method can also be used. In addition, the order in which the projection process is performed on the diagnostics images or the comparison images can be reversed. Interpolation for both of the images is performed after a CT value adding process for both of the images is performed. There is another method for generating the projection images in which slice images at intervals of cm is are interpolated so as to generate slice images at intervals of mm, and then, the adding process is performed on the generated slice images. However, by using the method of the above-mentioned embodiment in which the adding process is performed before interpolation, processing can be performed faster.

Figure 8:
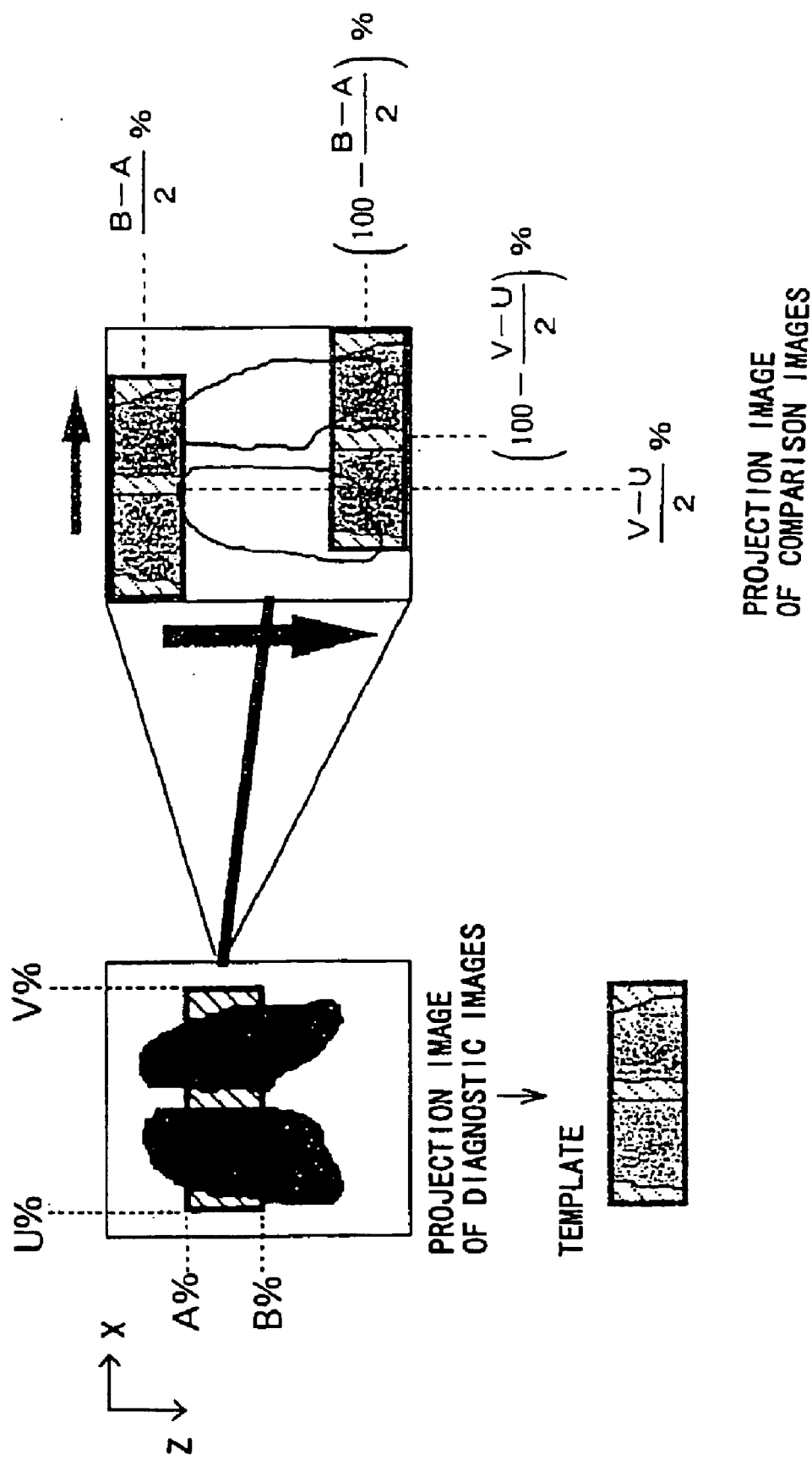
FIG. 8 is a diagram for explaining template pattern matching method according to the first embodiment.

Next, in step 5 in the flowchart, a template for searching the projection image of the comparison images by the projection image of the diagnostics images (template generation processing part 112-6). FIG. 8 is a diagram for explaining template pattern matching when using the projection image in the Y axial direction.

In the example shown in FIG. 8, a rectangular template is generated in the projection image around the area of aortic arch which is in the upper part of lung. That is, the template covers the area of 25%~50% from the top end of the image in the Z axial direction and 10%~90% from the left end of the image in the X axial direction which covers width of lung in the image. Generally, in the projection image of the diagnostic images, the rectangular template is generated as an area which is A %~B % (A, B∈[0, 100]) from the top end of the object in the Z axial direction and U %~V % (U, V∈[0, 100]) from the left end of the object in the X axial direction.

In the case that the object of the diagnostic images is lung, by using the template which is 25%~50% from the top end of the projection images in the Z axial direction as mentioned above, the after-mentioned pattern matching can be performed effectively. Generally, it is desirable that the area of the template is determined such that texture is relatively plainly visible and amount of change of the image due to breathing or the like is small.

Next, pattern matching is performed in step 6. That is, in order to search for an area in the comparison projection image which is the same as the template, pattern matching is performed while shifting the center of the template by several mm from (50−25)/2=12.5% to 100−12. 5=87.5% in the Z axial direction and from (90−10)/2=40% to 100−40= 60% in the X axial direction. Generally, pattern matching is performed while shifting the center of the template from (B−A)/2% to 100−(B−A)/2% in the Z axial direction and from (V−U)/2% to 100−(V−U)/2% in the X axial direction (matching processing part 112-7).

Finally, in step 7, when the same area as the template is found in the comparison projection image, the shift amount of the comparison projection image in the Z axial direction is measured and the slice position of the comparison image sequence is corrected by the shift amount (slice position correction processing part 112-8). Then, in step 8, the diagnostic image and the comparison image in the slice position which has been corrected are displayed on a display of the image comparison system in FIG. 3 or the monitor (monitor 15) of the image alignment apparatus in FIG. 4 (display processing part 112-9).

After displaying the images on the display, precise position adjustment is available by using the MIDI device such as the pedal, the dial or the slider. That is, each of the positions of the diagnostic images and the comparison images can be adjusted in the Z axial direction. In addition, after the position is adjusted, both of the slice images can be displayed while synchronizing them. Accordingly, by using a MIDI device for terminal operation in the image comparison, the operation becomes effective.

In the above-mentioned embodiment, the direction for projection is not limited to the Y axial direction. The X axial direction and any other directions can be used. In addition, the method for adjusting resolution is not limited to scaling the comparison images. There's nothing wrong with using methods such as scaling the diagnostic images or scaling both of the images.

Second Embodiment

Next, the second embodiment of the present invention will be described.

In the following embodiment, concerning chest X ray CT images for lung cancer screening, it is assumed that present images are compared with previous images.

The definitions of the X, Y and Z axes are the same as those shown in FIGS. 1A and 1B. That is, the X-Y axial direction forms a slice plane of a tomographic of a body such as chest or the like as shown in FIG. 1B, and the Z axial direction is a moving direction of a patient bed as shown in FIG. 1A. The chest X ray CT images for lung cancer screening are taken by a helical scan CT shown in FIG. 1A and information of slice thickness in the Z axial direction is included in a slice image of chest tomographic of X-Y axial directions. The number of images to be taken is from 25 to 30 for one person.

Figures 9A, 9B:
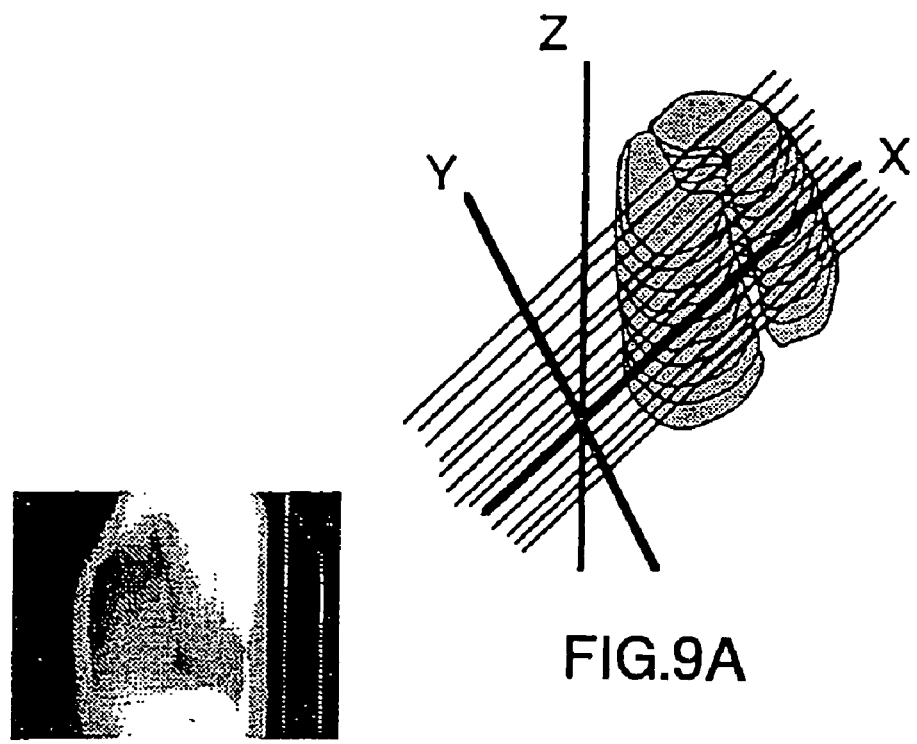
FIG. 9A shows the direction of projection according to a second embodiment of the present invention
FIG. 9B is a projection image in the X axial direction according to the second embodiment.

FIGS. 9A and 9B are diagrams showing examples of projection. FIG. 9A shows the direction of projection. FIG. 9B is a projection image in which all CT values, which are density value in the image, are added in the X axial direction shown in FIG. 9A.

Figure 10:
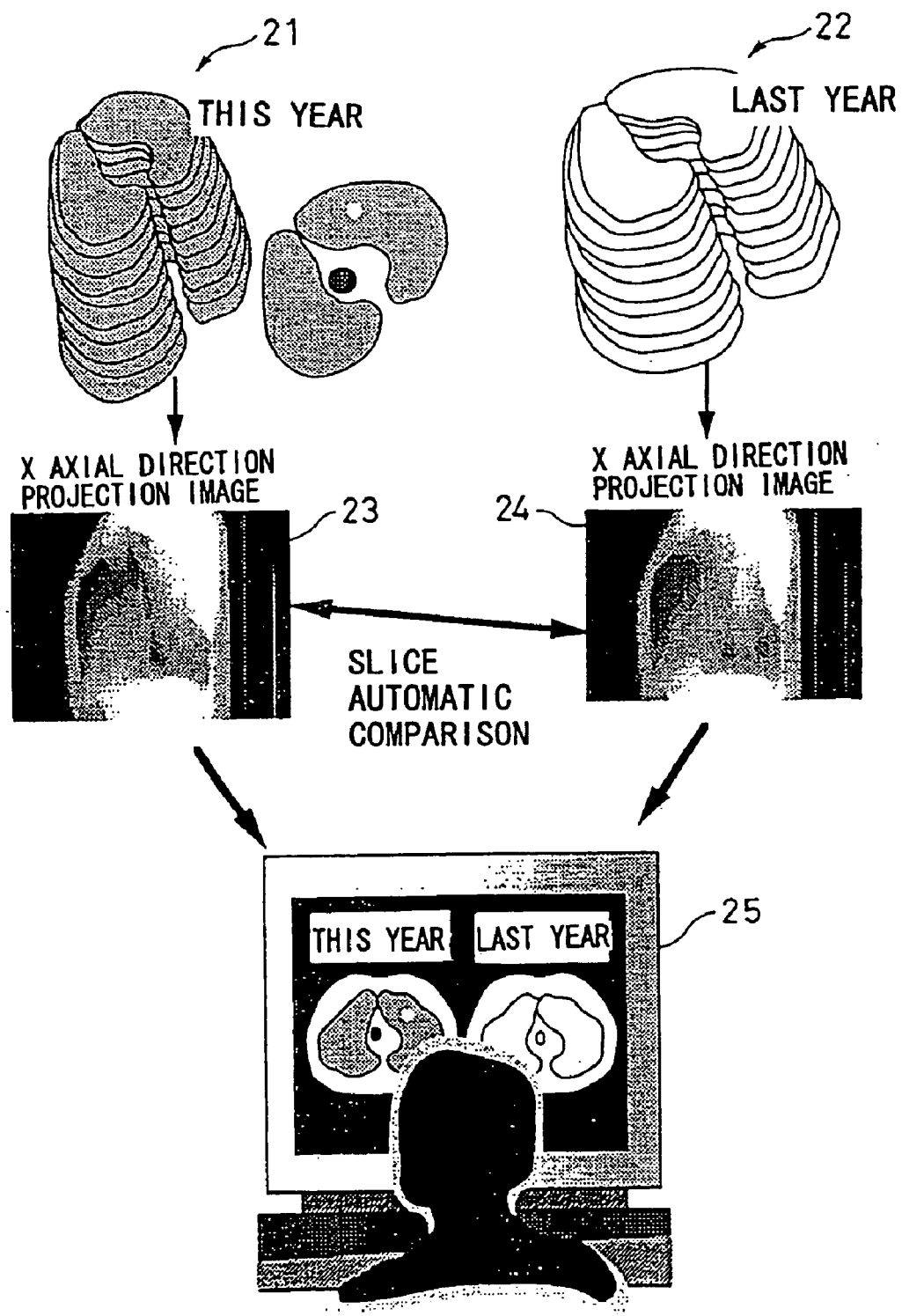
FIG. 10 is a schematic diagram showing a configuration example of a chest CT image alignment apparatus according to the second embodiment.

FIG. 10 is a schematic diagram showing a configuration example of a chest CT image alignment apparatus according to the embodiment.

A reference number 21 shows a file storing chest tomographic images (diagnostic images) taken this year and a reference number 22 shows a file storing chest tomographic images (comparison images) taken past year. A reference number 23 shows an X axis direction projection image generated by the file 21 and a reference number 24 shows an X axis direction projection image generated by the file 22. In the sequence of CT images stored in the files 21, 22, position shift between slices has occurred due to a difference of subject positions or by deformation of lung due to breathing. A reference number 25 shows a computer system for automatically aligning positions of slice images of the file 21 and position of slice images of the file 22 and displaying slice images at an aligned position.

Figure 11:
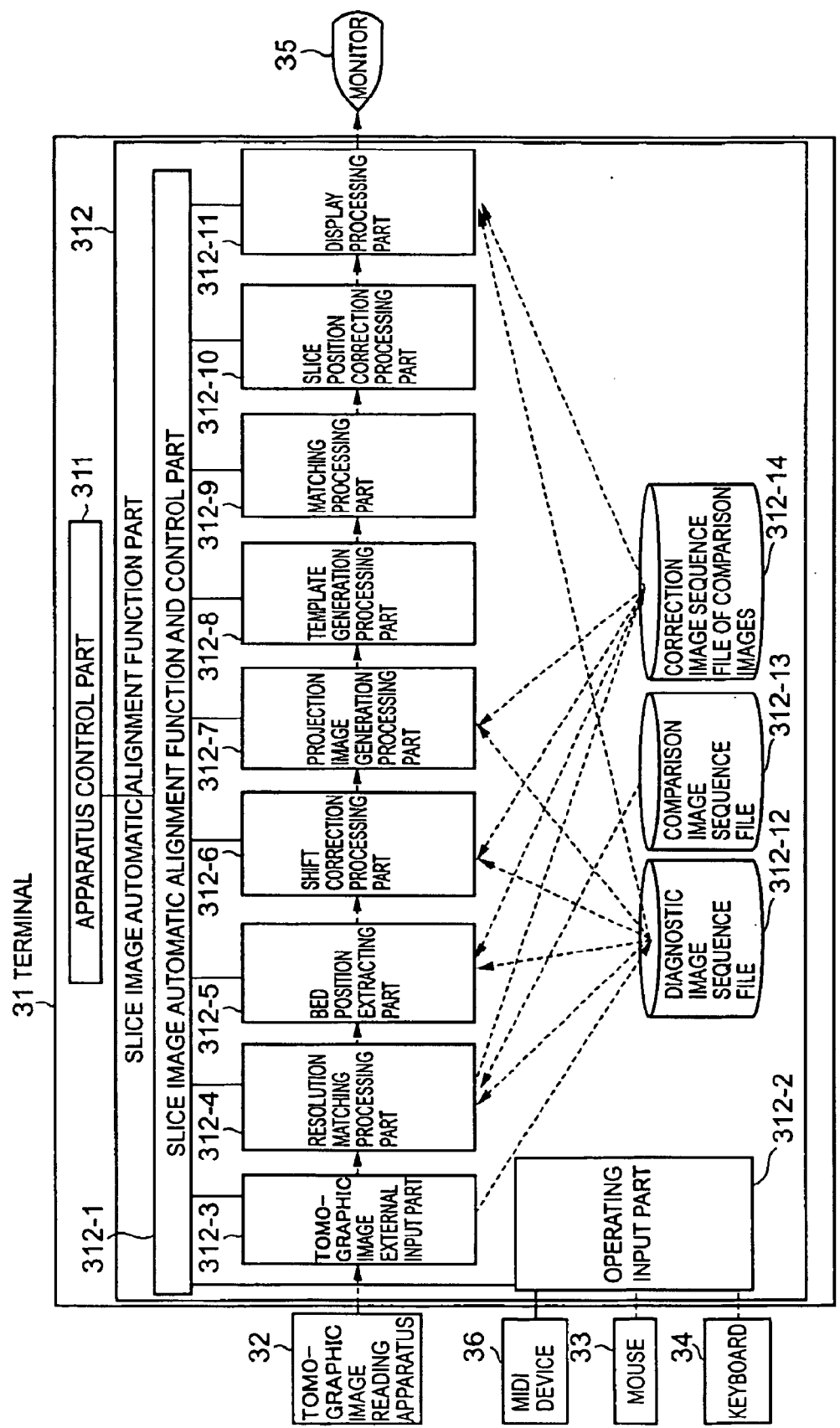
FIG. 11 is a block diagram showing another configuration example of the chest CT image alignment apparatus according to the second embodiment.

FIG. 11 is a block diagram showing another configuration example of the chest CT image alignment apparatus according to the embodiment.

The chest CT image alignment apparatus includes a terminal apparatus 31 to which a tomographic image reading apparatus 32, a mouse 33, a keyboard 34, and a monitor 35 are connected. The terminal apparatus 31 includes an apparatus control part 311 and a slice image automatic alignment function part 312 for three-dimension tomographic images. The slice image automatic alignment function part 312 for three-dimension tomographic images includes a slice image automatic alignment function and a control part 312-1 for three-dimension tomographic images, a diagnostic image sequence file 312-12, a comparison image sequence file 312-13 and a correction image sequence file 312-14 of comparison images. An operating input part 312-2, a tomographic image external input part 312-3, a resolution matching processing part 312-4, a bed position extracting part 312-5, a shift correction processing part 316-6, a projection image generation processing part 312-7, a template generation processing part 312-8, a matching processing part 312-9, a slice position correction processing part 312-10, and a display processing part 312-11 are connected to the slice image automatic alignment function and control part 312-1 for three-dimension tomographic images. The operating input part 312-2 performs operating input by connecting the mouse 33 and the keyboard 34. The tomographic image external input part 312-3 inputs tomographic images from the tomographic image reading apparatus 32. The display processing part 312-11 displays diagnostic images and comparison images to the monitor 35.

The tomographic image external input part 312-3 writes data to the diagnostic image sequence file 312-12. The resolution matching processing part 112-4 reads data from the diagnostic image sequence file 312-12 and the comparison image sequence file 312-13. In addition, the resolution matching processing part 312-4 writes in the correction image sequence file 312-14 of comparison images. The shift correction processing part 3126 corrects shift between the diagnostic image and the comparison image based on the bed position. The projection image generation processing part 312-7 and the display processing part 312-11 read data from the diagnostic image sequence file 312-12 and the correction image sequence file 312-14 of comparison images.

A MIDI device 36 such as a pedal, a dial, and a slider which is mentioned before is connected to the operating input part 312-2.

Figure 12:
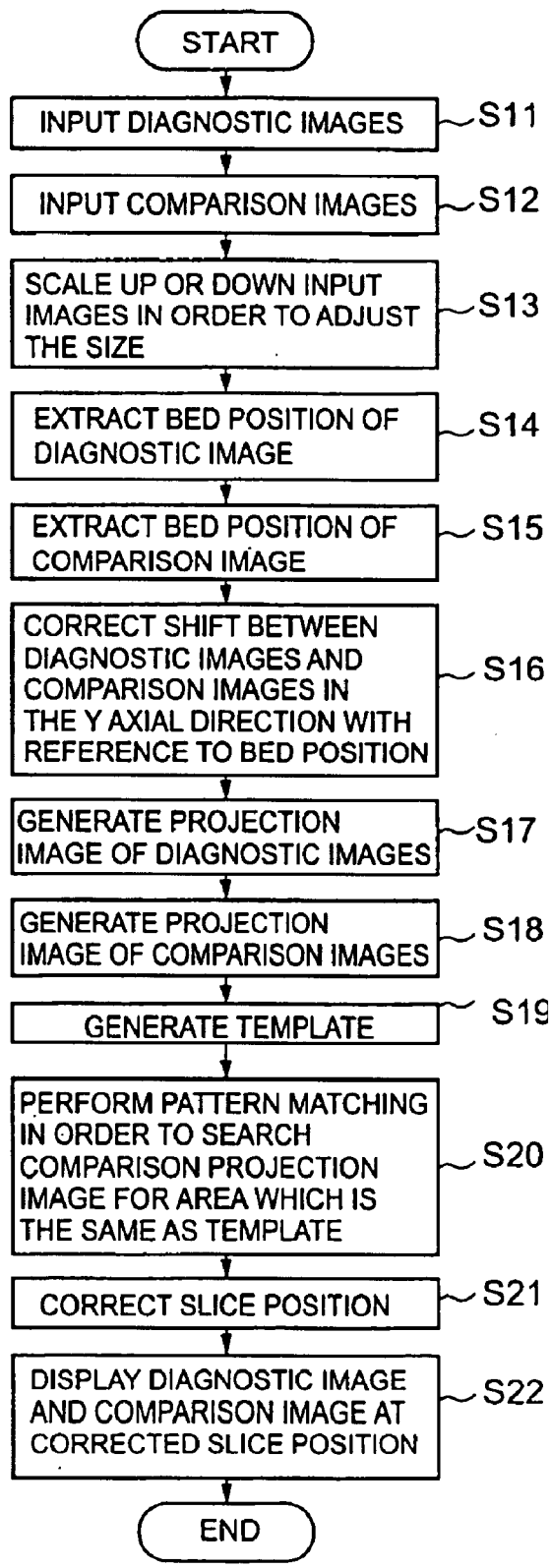
FIG. 12 is a flowchart showing a procedure for measuring position shift and displaying the diagnostic image and the comparison image of the same position according to the second embodiment.

FIG. 12 is a flowchart showing a procedure for measuring position shift and displaying the diagnostic image and the comparison image of the same position by software in the computer shown in FIG. 10 or by processing parts of the image alignment apparatus shown in FIG. 11 in order to support image comparison. In the flowchart, parenthesized processing parts, which are included in the image alignment apparatus in FIG. 11, corresponding to the following procedure are shown. The flowchart will be described.

In FIG. 12, diagnostic image sequence $f_Z(x, y)$ and comparison image sequence $g_Z(x, y)$ are input in step 11 and step 12 (tomographic image external input part 312-3).

In step 13, when resolution of the diagnostic images and resolution of the comparison images are different, resolution matching processing is performed for correcting the comparison images such that the resolution of the comparison images agree with that of the diagnostic images by scaling using three-dimension interoperation or leaner interpolation (resolution matching processing part 312-4).

Figure 13:
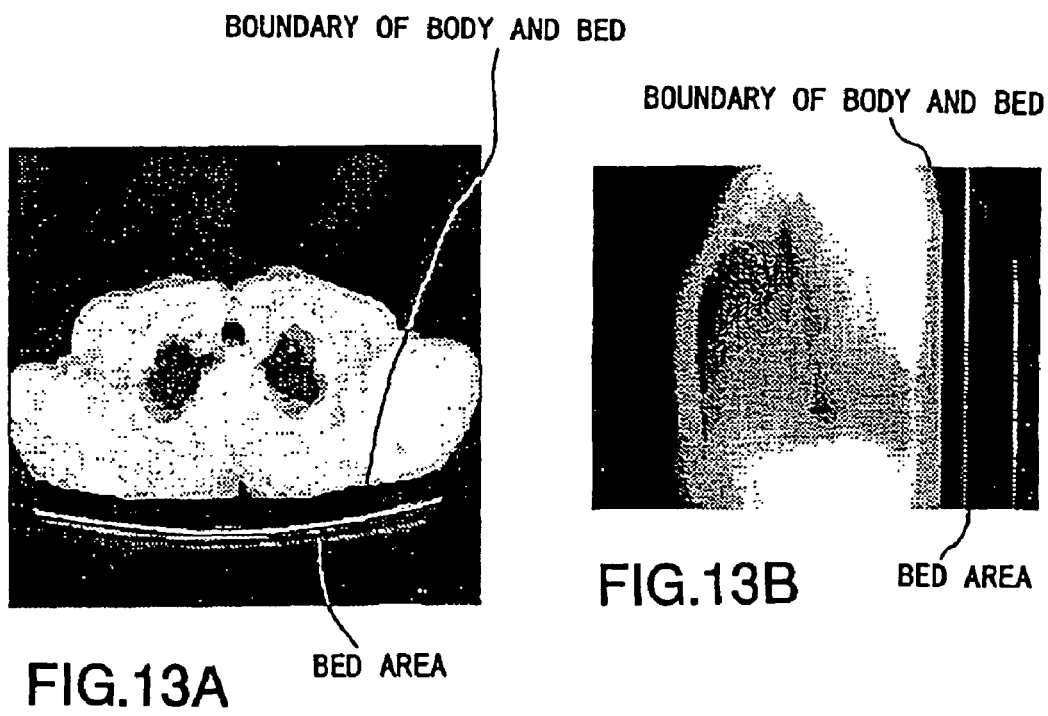
FIG. 13A is a diagram for explaining a reference point for correcting shift in the Y axial direction according to the second embodiment.
FIG. 13B is a diagram for explaining a reference point for correcting shift in the Y axial direction according to a third embodiment.

In step 14 and 15, a bed area is extracted from each of the first diagnostic image and the first comparison image (bed position extracting part 312-5). Then, in step 16. Y axis direction shift between the diagnostic image and the comparison images is corrected on the basis of the extracted bed position in which the Y axis direction is perpendicular to the bed position (shift correction processing part 316-6). The bed area is shown in FIG. 13A.

In step 17 and step 18, an X axis direction projection image is generated in which the X axis is defined as a direction perpendicular to the corrected Y axis direction (projection image generation processing part 312-7). Projection images are calculated as shown in formulas (5) and (6) in which XSIZE is the size of the slice image in the X axis direction, $d_1(y, z)$ is the X axis direction projection image of the diagnostic images and $d_2(y, z)$ is the X axis direction projection image of the comparison images.

$$d_1(y, z) = (\Sigma_{x=0}^{XSIZE} f_Z(x, y))/XSIZE \quad (5)$$

$$d_2(y, z) = (\Sigma_{x=0}^{XSIZE} g_Z(x, y))/XSIZE \quad (6)$$

Since the resolution of the images for screening in the Y axial direction is different from that in the Z axial direction the projection images are interpolated by the leaner interoperation method or the three-dimensional interpolation method. A most neighborhood method can also be used for interoperation.

Figure 14:
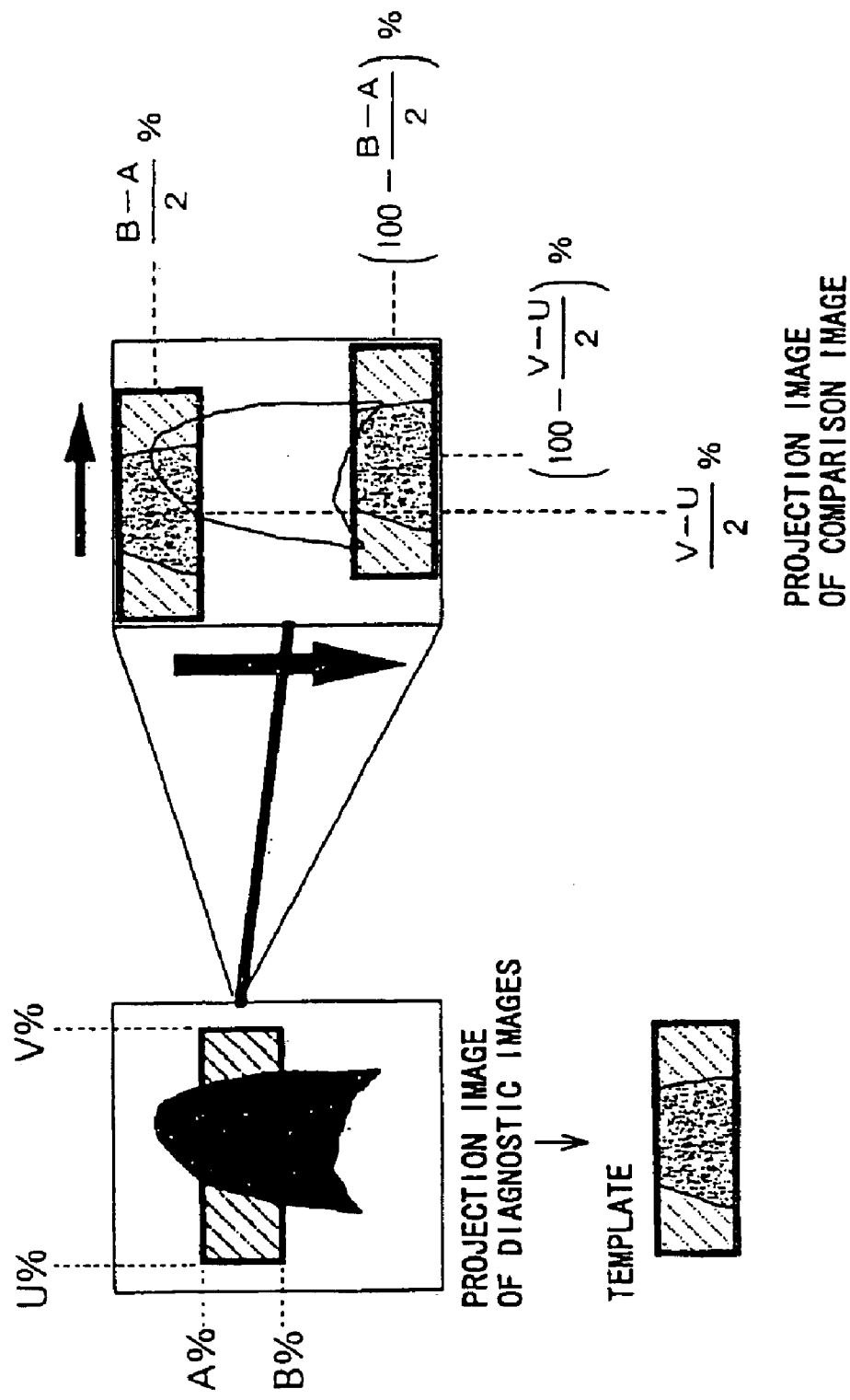
FIG. 14 is a diagram for explaining template pattern matching method according to the second and third embodiments.

Next, in step 19, as shown in FIG. 14, a rectangular template is generated in the projection image around the area of the aortic arch which is in the upper part of lung. That is, the template covers the area of 25%~50% from the top end of the image in the Z axial direction and 10%~90% from the left end of the image in the Y axial direction which covers width of lung in the image. In step 20, in order to search for the same area in the comparison projection image as the template, pattern matching is performed while shifting the center of the template by several mm in the Z axial direction and in the Y axial direction. When the same area as the template is found in the comparison projection image, in step 21, the shift amount of the comparison projection image in the Z axial direction is measured and the slice position of the comparison image sequence is corrected by the shift amount. In step 22, the diagnostic image and the comparison image in the slice position which has been corrected are displayed on a display of the image alignment system in FIG. 10 or the monitor (monitor 35) of the image alignment apparatus in FIG. 11. After displaying the images on the display, precise position adjustment is available by using the MIDI device such as the pedal, the dial or the slider.

In the second embodiment, similar to the first embodiment, by using the template which is 25%~50% from the top end of the projection images in the Z axial direction as mentioned above, the pattern matching can be performed effectively.

Third Embodiment

As shown in FIG. 13B, it is also possible to extract the bed area after generating the projection image. In the flowing, an embodiment in which the bed area is extracted after generating the projection image will be described as the third embodiment.

Figure 15:
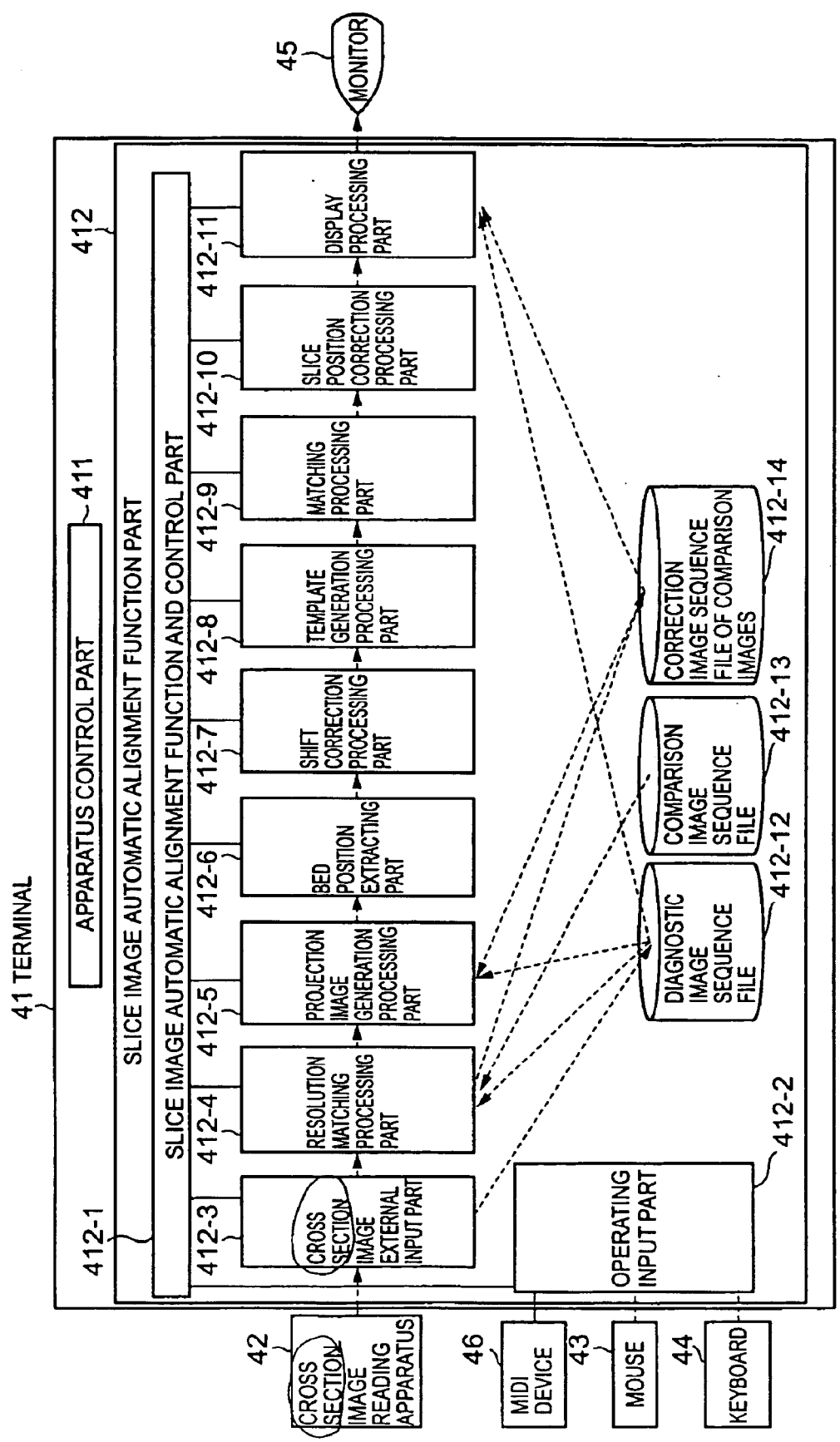
FIG. 15 is a block diagram showing a configuration example of the chest CT image alignment apparatus according to the third embodiment.

FIG. 15 is a block diagram showing an configuration example of the chest CT image alignment apparatus according to the embodiment. The apparatus can be configured as a computer system in the same way as the second embodiment shown in FIG. 10.

The chest CT image alignment apparatus includes a terminal apparatus 41 to which a tomographic image reading apparatus 42, a mouse 43, a keyboard 44, and a monitor 45 are connected. The terminal apparatus 41 includes an apparatus control part 411 and a slice image automatic alignment function part 412 for tomographic images. The slice image automatic alignment function part 412 for tomographic images includes a slice image automatic alignment function and control part 412-1 for tomographic images, a diagnostic image sequence file 412-12, a comparison image sequence file 412-13 and correction image sequence file 412-14 of comparison images. An operating input part 412-2, a tomographic image external input part 412-3, a resolution matching processing part 412-4, a projection image generation processing part 412-5, a bed position extracting part 412-6, a shift correction processing part 412-7, a template generation processing part 412-8, a matching processing part 412-9, a slice position correction processing part 412-10, and a display processing part 412-11 are connected to the slice image automatic alignment function and control part 412-1 for tomographic images. The operating input part 412-2 performs operating input by connecting the mouse 43 and the keyboard 44. The tomographic image external input part 412-3 inputs tomographic images from the tomographic image reading apparatus 42. The display processing part 412-11 displays diagnostic images and comparison images to the monitor 35.

The tomographic image external input part 412-3 writes data to the diagnostic image sequence file 412-12. The resolution matching processing part 412-4 reads data from the diagnostic image sequence file 412-12 and the comparison image sequence file 412-10. In addition, the resolution matching processing part 412-4 writes in the correction image sequence file 412-12 of comparison images. The shift correction processing part 412-7 corrects shift between the diagnostic image and the comparison image based on the bed position. The projection image generation processing part 412-5 and the display processing part 412-11 read data from the diagnostic image sequence file 412-12 and the correction image sequence file 412-14 of comparison images.

A MIDI device 46 such as a pedal, a dial, or a slider which is mentioned before is connected to the operating input part 412-2.

Figure 16:
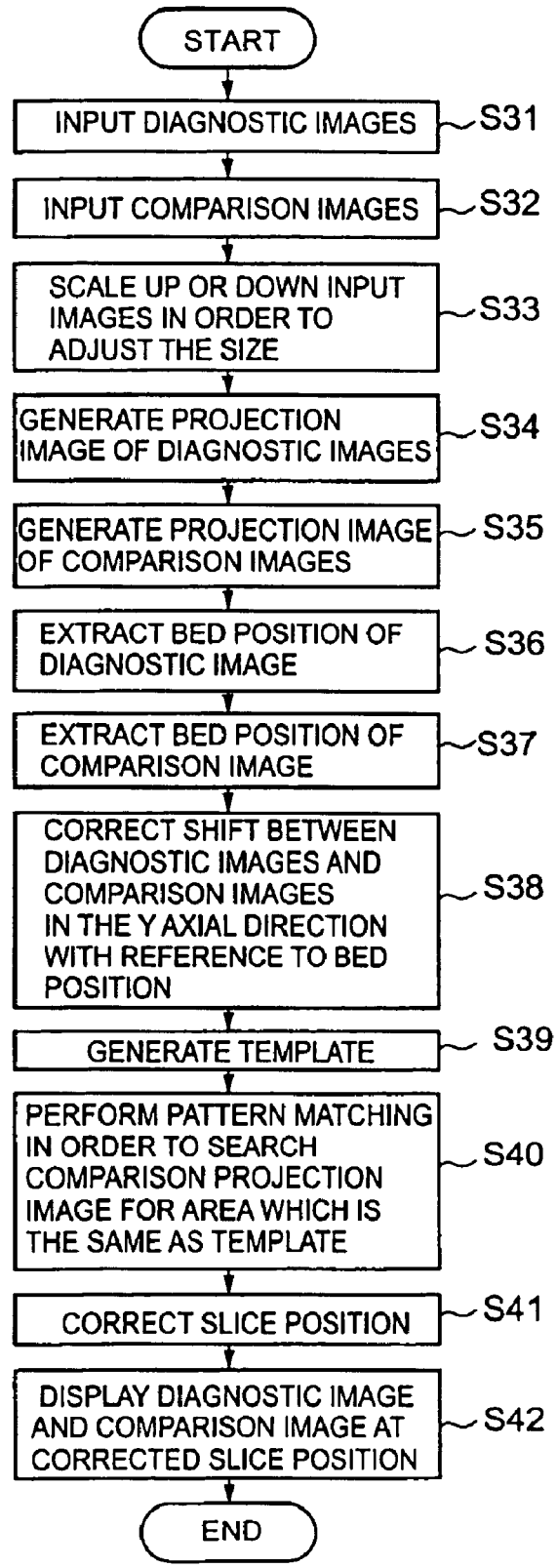
FIG. 16 is a flowchart showing a procedure for measuring position shift and displaying the diagnostic image and the comparison image of the same position according to the third embodiment.

FIG. 16 is a flowchart showing a procedure for measuring position shift and displaying the diagnostic image and the comparison image of the same position by software in the computer system or by processing parts of the image alignment apparatus shown in FIG. 15 in order to support image comparison. In the flowchart, parenthesized processing parts, which are included in the image alignment apparatus in FIG. 15, corresponding to the following procedure are shown. The flowchart will be described.

In FIG. 16, diagnostic image sequence $f_Z(x, y)$ and comparison image sequence $g_Z(x, y)$ are input in step 31 and step 32 (tomographic image external input part 412-3).

In step 33, when resolution of the diagnostic images and resolution of the comparison images are different, resolution matching processing is performed for correcting the comparison images such that the resolution of the comparison images agree with that of the diagnostic images by scaling using three-dimensional interoperation or leaner interpolation (resolution matching processing part 412-4).

In step 34 and step 35, X axis direction projection images are generated (projection image generation processing part 412-7). Projection images are calculated as shown in formulas (7) and (8) in which XSIZE is the size of the slice image in the X axis direction, $d_1(y, z)$ is the X axis direction projection image of the diagnostic images and $d_2(y, z)$ is the X axis direction projection image of the comparison images.

$$d_1(y, z) = (\Sigma_{x=0}^{XSIZE} f_Z(x, y))/XSIZE \tag{7}$$

$$d_2(y, z) = (\Sigma_{x=0}^{XSIZE} g_Z(x, y))/XSIZE \tag{8}$$

Since the resolution of the images for screening in the Y axis direction is different from that in the Z axis direction, the projection images are interpolated by the leaner interoperation method or the three-dimensional interpolation method. A most neighborhood method can also be used for the interoperation method.

In step 36 and 37, a bed area is extracted from each of the diagnostic projection image and the comparison projection image (bed position extracting part 412-5). Then, in step 38, Y axis direction shift between the diagnostic image and the comparison images is corrected on the basis of the extracted bed position in which the Y axis direction is defined as a direction perpendicular to the bed position (shift correction processing part 412-6). The bed area is shown in FIG. 13B.

Next, in step 39, as shown in FIG. 14, a rectangular template is generated in the projection image around the area of aortic arch which is in the upper part of lung. That is, the template covers the area of 25%~50% from the top end of the image in the Z axial direction and 10%–90% from the left end of the image in the Y axial direction which covers width of lung in the image. In step 40, in order to search for the same area in the comparison projection image as the template, pattern matching is performed while shifting the center of the template by several mm in the Z axial direction and in the Y axial direction. When the same area as the template is found in the comparison projection image, in step 41, the shift amount of the comparison projection image in the Z axial direction is measured and the slice position of the comparison image sequence is corrected by the shift amount. In step 42, the diagnostic image and the comparison image in the slice position which has been corrected are displayed on a display of the image alignment system in FIG. 10 or the monitor (monitor 45) of the image alignment apparatus in FIG. 15. After displaying the images on the display, precise position adjustment is available by using the MIDI such as the pedal, the dial or the slider.

In the third embodiment, similar to the first embodiment, by using the template which is 25%~50% from the top end of the projection images in the Z axial direction as mentioned above, the pattern matching can be performed effectively.

In the second and third embodiments, other distinctive areas such as a backbone area or a body part contacting the bed area can be used as the reference for correcting Y axis direction shift between the diagnostic image and the comparison image.

In the first, second and third embodiments, when generating the projection image of the diagnostic images or the comparison images, better matching result for the part of bone can be obtained by generating tomographic images in which weight is assigned to bone parts and perform matching by using the images. Specifically, in the above method, image representation density is not set by using density gradation of the actual CT image which is from 0 level to the maximum level gray-scale. Instead, a window level (central density value) and a window width (density width from the central density value) is set by using a mediastinum condition in which bone is highly visible.

Similarly, by setting the representation density as the window level and the window width by using lung area condition in which lung texture is highly visible, better matching result for the part of lung texture can be obtained by generating tomographic images in which weight is assigned to the lung texture. The MIDI device can be used for setting the window level and the window width.

In the first, second and third embodiments, the method for adjusting resolution is not limited to scaling the comparison images. There's nothing wrong with using methods such as scaling the diagnostic images and scaling both of the images.

In the first, second and third embodiments, the chest X ray CT image is described as an example. However, the present invention is applicable to tomographic images of other parts and applicable to tomographic images other than the CT images.

Further, in the first, second and third embodiments, better matching result for a specific part and speedy processing can be realized by generating the projection image in which only an area including the specific part is added in a direction and by performing matching by using the projection image, the specific part including a distinctive part.

Further, in the first, second and third embodiments, when measuring the shift amount between the projection image of the diagnostic images and the projection image of the comparison images, a plurality of templates can be generated from the projection image of the diagnostic images and template matching can be performed by using the templates on the projection image of the comparison images such that the shift amount is measured from a plurality of reference points. Accordingly, shift correction of the slice position becomes more accurate and the better matching result can be obtained. Especially, when comparing the lower part of lung, shift due to breathing can be corrected.

Further, in the embodiments, the procedures shown in FIGS. 5, 6, 7, 12 and 16 can be realized by a computer as mentioned above. The program for performing the procedure can be stored in a computer-readable medium such as a FD(floppy disk), an MO, a ROM, a memory card, a CD, a DVD, a removable disk or the like. In addition, providing or distributing the medium is possible.

Figure 17:
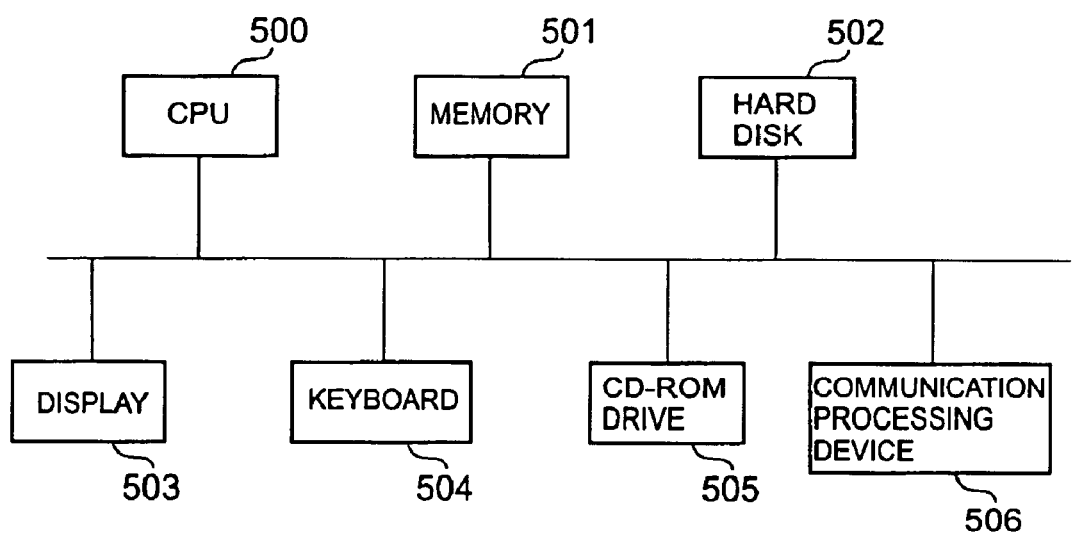
FIG. 17 is a block diagram showing a hardware configuration of a computer.

FIG. 17 is a block diagram showing a hardware configuration of such a computer. As shown in FIG. 17, the computer system includes a CPU 500 by which a process of a program is executed, a memory 501 for temporarily storing data and a program, a hard disk 502 for storing data and a program to be loaded into the memory 501, a display 503 for displaying data, a keyboard 504 for inputting data or commands, a CD-ROM drive 505 and a communication processing unit 506 which enables the computer system to communicate with other computers via a network. The program is installed in the hard disk 502 via the CD-ROM drive 505 then loaded into memory 501 and executed by the CPU 500. According to the computer, the image alignment of the present invention can be performed.

As mentioned above, according to the image alignment apparatus of the present invention, slice images of the same body position can be obtained automatically at high speed from two groups of the chest tomographic images of the same person such that the slice images can be presented to a doctor in a short time. In addition, some work for comparing the images beforehand and excessive computer memory area become unnecessary. Further, by using the template which is 25%~50% from the top end of the projection images in the Z axial direction, pattern matching can be performed effectively such that position alignment is performed quickly.

In the following, a description is provided of the MIDI device which is connected to the operation input part of the image alignment apparatus for control purposes.

Generally, MIDI (Musical Instrument Digital Interface) is a communication control standard for electronic musical instruments which is supported by many personal computers. When a control device such as a dial, a slider or a pedal is necessary for control of a computer, a control device supporting MIDI can be connected relatively easily and the control device can be easily changed and easily increased.

Generally, resolution of 128 stages of 0–127 are defined for describing continuous amount change in MIDI signals. Therefore, it does not support control which is finer than the 128 stages. Thus, when control which is finer than the 128 stages is necessary in MIDI, a system exclusive message (exclusive information for the system) is used. In this case, although the information is in conformity with the MIDI standard, there is no compatibility. As a result, it becomes difficult to change to another control device which is commercially available.

On the other hand, the MIDI device used for the image alignment apparatus can receive and send signals of higher resolution than 128 stages while keeping compatibility with commercially available MIDI devices. In the following, the method for receiving and sending the signals of higher resolution will be described. Here, a MIDI slider is taken as an example and the case in which 256 stage resolution is necessary is taken as an example.

Figure 18:
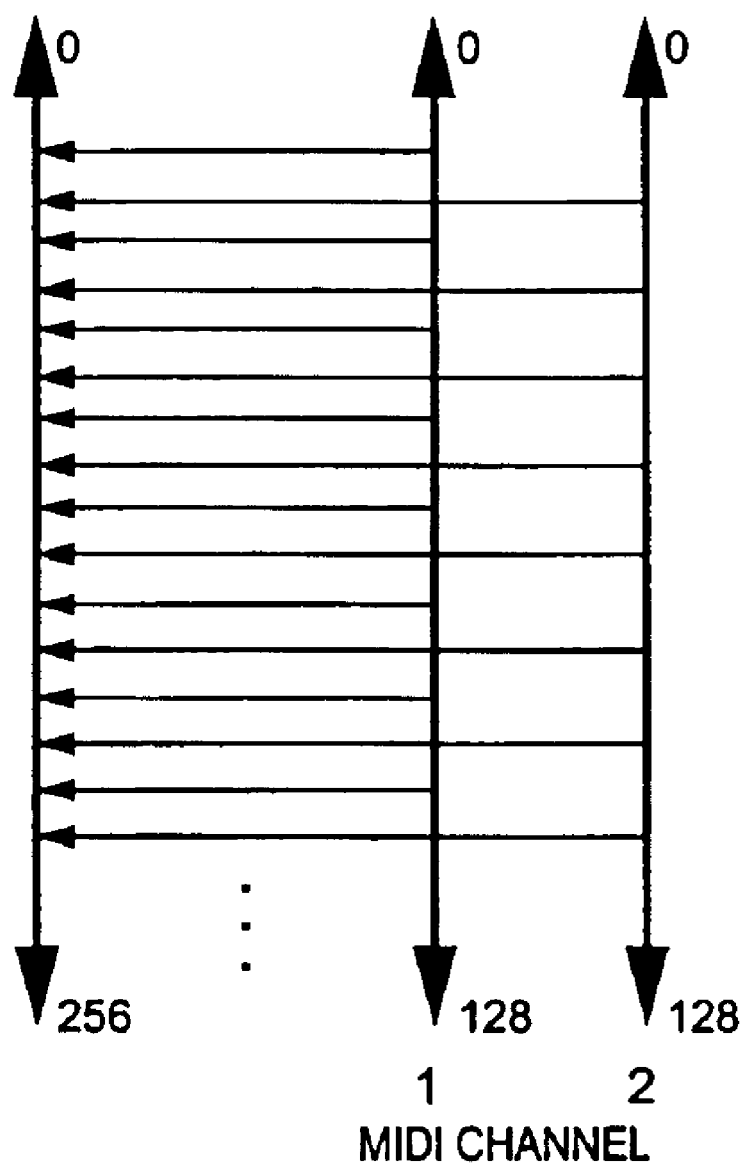
FIG. 18 is a diagram for explaining signal assignment.

Generally, the control signal of MIDI device has resolution of 128 stages of 0–127. Therefore, if it is used as it is, higher resolution than 128 stages can not be realized. For this reason, a 256 stage resolution MIDI slider is designed in which two MIDI channels are used and data is output by assigning alternately to the channels as shown in FIGS. 18 and 19.

A MIDI control change signal includes a first byte (MIDI channel:identifying each instrument), a second byte (control No.: specifying a type of control medium) and a third byte (control value:specifying concrete control value).

It is desirable that channels and control numbers used for realizing high resolution are those which are not mainly used in a normal controller. However, to simplify the description, the original MIDI signal uses a channel 1 and a control number A, and MIDI channel 2 and the same control number A are used for realizing high resolution.

An application in the MIDI signal receiving side receives position values of the slider, each of which position value is one of values obtained by dividing slider change width into 128. In addition, when a value comes from the channel 2, the application is set such that it interprets the value as 1/256 higher than a value of the channel 1.

In FIG. 19, "slider position" corresponds to a value in 256 stages (the range is from 124 to 143 for the sake of convenience), "ch" is the channel and "value" is the value of 128 stages output from a slider. When using one channel, the values of 128 stages of the right section are converted into the value of 256 stages (62/128→124/256. When two channels, 1/256 is added to the values converted to 256 stages (62/128→124/256+1 256=125/256).

As a result, the receiving application can recognize the position of the slider at 256 stage resolution when using the high resolution MIDI slider. In addition, when a normal MIDI slider is connected instead of the high resolution slider, the normal MIDI slider can receive the same information without any modification.

The high resolution slider is a slider which can use higher resolution signal than the conventional slider. Conventionally, one channel and one control number is assigned to a slider and the slider outputs a value from 1 to 128 according to the movement of the slider. On the other hand, necessary channels and control numbers for realizing high resolution are assigned to the high resolution MIDI slider which outputs signals by synthesizing the channels and control numbers according to the method of the present invention. In the present invention, only the value of the slider and the method for assigning the MIDI signal are defined. Hardware and the configuration for realizing the method are not defined.

By assigning control number instead of the channel, the same effect can be obtained. In practical use, an unassigned channel or a unassigned control number should be selected.

In this embodiment, signals are assigned according to the order of MIDI channels to be multiplexed. In addition, the order can be reverse or random or the like as long as both the receiving side and the sending side have been correlated.

In this embodiment, high resolution signals are divided into equal parts for grouping. However, the signals are not necessarily divided uniformly. That is, when only a part needs high resolution, only the part may be divided into smaller parts such that the parts are allocated to a plurality of channels, control numbers or the combinations.

Figure 20:
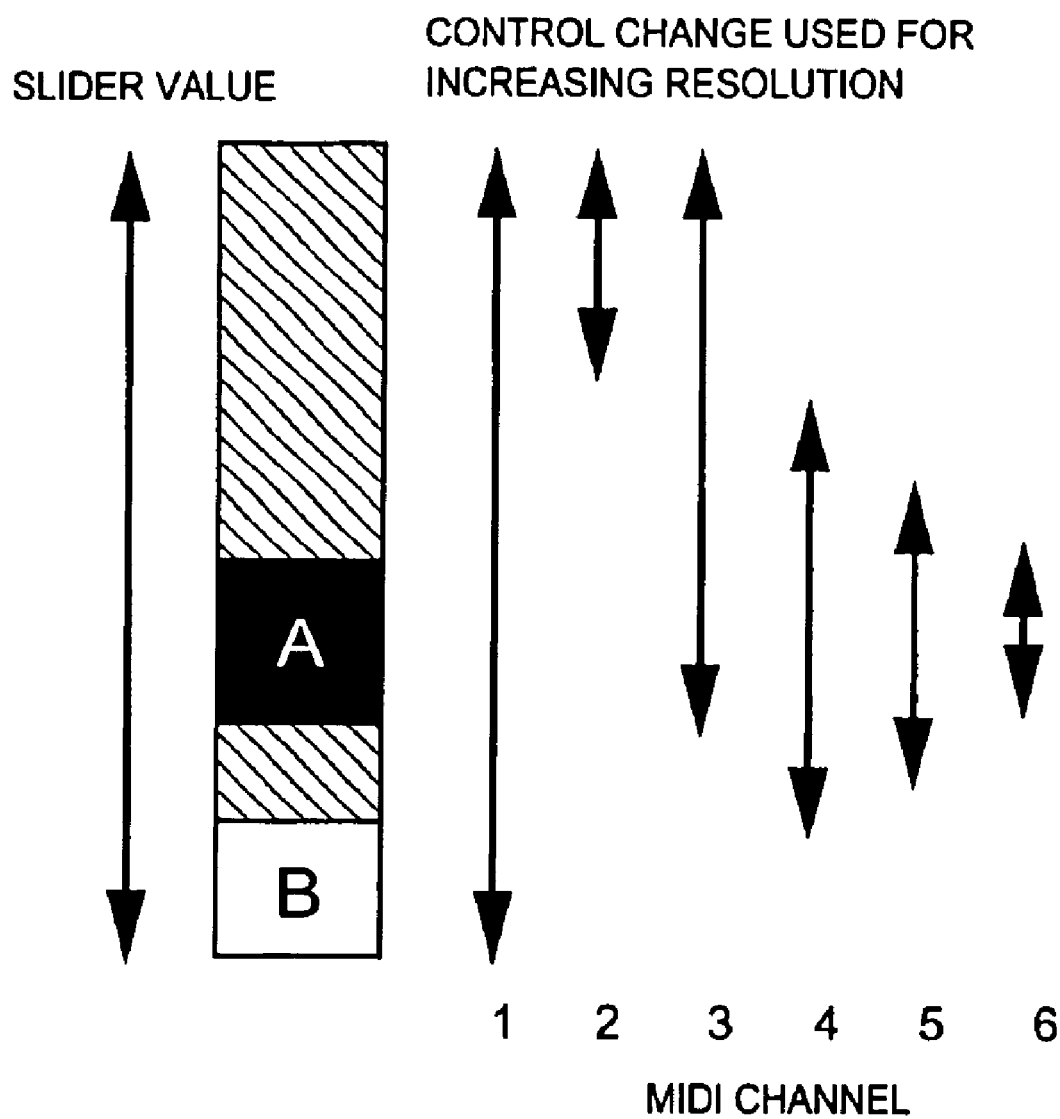
FIG. 20 is a diagram for explaining a method for assigning channels, control numbers and the combinations.

In addition, it is not necessary to assign the channels, control numbers or the combinations to fixed specific change areas. Instead, they may be overlapped partially as shown in FIG. 20. In this example, six control changes for six MIDI channels are used. In the area A, the resolution is five times larger. In the area B, the resolution is the same as normal state. This method is applicable when precise control is necessary in only a portion of the change area.

As mentioned above, the MIDI signal constructing method includes the steps of: providing n different MIDI channels or control numbers or combinations of them for a signal x which has 128×n stages in which n is a positive integer; assuming the MIDI channels or the control numbers or the combinations as p=1,2, . . . n; dividing the signal x into 128 parts W(1)(1; 0≦1≦127) in ascending order and assigning p which is equal to r+1 (r: 0≦r<n) to the signal x which is equal to 1×n+r; constructing and sending a MIDI control change message in which a control value is 1 by using a MIDI channel or control number corresponding to p.

By using the MIDI signal constructing method, when a specific MIDI controller which outputs signals according to the present invention is used, signals according to the resolution can be transmitted and received. When a conventional controller is used, the same control as the specific controller can be performed as a whole. Therefore, by using the MIDI device for the image alignment apparatus of the present invention, precise control can be performed.

The present invention is not limited to the specifically disclosed embodiments, and variations and modifications may be made without departing from the scope of the invention.

What is claimed is:

1. A tomographic image reading method for extracting a comparison image corresponding to a diagnostic image, and displaying the images, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said method comprising the steps of:

inputting said first tomographic images and said second tomographic images;

generating a first projection image from said first tomographic images and a second projection image from said second tomographic images, wherein the direction of projection for generating each of said first and second projection images is perpendicular to the Z axial direction;

measuring shift amount between said first projection image and said second projection image by searching said second projection image for the same area as a template, said template being generated from said first projection image such that said template includes an area in which a specific object image exists;

correcting the slice position according to said shift amount between said first projection image and said second projection image; and displaying said diagnostic image and said comparison image at a corrected slice position to a monitor;

wherein the first projection image and the second projection image are used to find a comparison image whose slice position corresponds to a slice position of a diagnostic image, so that the corrected slice position is used to find a corresponding slice position.

2. The method of claim 1, further comprising:

adjusting positions of said diagnostic image and said comparison image which are displayed by providing a MIDI signal.

3. The method of claim 1, further comprising:

adjusting positions of said diagnostic image and said comparison image which are displayed, wherein the adjusting includes constructing a MIDI signal by:

providing different MIDI channels or control numbers or combinations of them for a signal;

dividing said signal into a number of parts and assigning a number to said signal; and constructing a MIDI control change message by using a MIDI channel or a control number.

4. The method of claim 1, further comprising:

adjusting positions of said diagnostic image and said comparison image which are displayed, wherein the adjusting includes constructing a MIDI signal by:

providing n different MIDI channels or control numbers or combinations of them for a signal x;

assuming said MIDI channels or said control numbers or said combinations as p=1,2, . . . n;

dividing said signal x into a number of parts and assigning p to said signal x; and constructing a MIDI control change message by using a MIDI channel or a control number corresponding to p.

5. An image alignment method for extracting a comparison image corresponding to a diagnostic image and displaying the images, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said method comprising the steps of:

inputting said first tomographic images and said second tomographic images;

aligning resolutions of said first tomographic images and said second tomographic images by scaling one or both of said tomographic images when the resolutions of said first tomographic images and said second tomographic images are different;

generating a first projection image from said first tomographic images and a second projection image from said second tomographic images, wherein the direction of projection for generating each of said first and second projection images is perpendicular to the Z axial direction;

measuring shift amount between said first projection image and said second projection image by searching said second projection image for the same area as a template by performing pattern matching while shifting said template by an interval, said template being generated from said first projection image such that said template includes an area in which a specific object image exists;

correcting the slice position according to said shift amount between said first projection image and said second projection image; and displaying said diagnostic image and said comparison image at a corrected slice position to a monitor;

wherein the first projection image and the second projection image are used to find a comparison image whose slice position corresponds to a slice position of a diagnostic image, so that the corrected slice position is used to find a corresponding slice position.

6. The method of claim 5, further comprising:

adjusting positions of said diagnostic image and said comparison image which are displayed by providing a MIDI signal.

7. The method of claim 5, further comprising:

adjusting positions of said diagnostic image and said comparison image which are displayed, wherein the adjusting includes constructing a MIDI signal by:

providing different MIDI channels or control numbers or combinations of them for a signal;

dividing said signal into a number of parts and assigning a number to said signal; and constructing a MIDI control change message by using a MIDI channel or a control number.

8. The method of claim 5, further comprising:

adjusting positions of said diagnostic image and said comparison image which are displayed, wherein the adjusting includes constructing a MIDI signal by:

providing n different MIDI channels or control numbers or combinations of them for a signal x;

assuming said MIDI channels or said control numbers or said combinations as p=1,2, . . . n;

dividing said signal x into a number of parts and assigning p to said signal x; and constructing a MIDI control change message by using a MIDI channel or a control number corresponding to p.

9. A tomographic image reading method for extracting a comparison image corresponding to a diagnostic image, and displaying the images, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said method comprising the steps of:

inputting said first tomographic images and said second tomographic images;

generating a first projection image from said first tomographic images and a second projection image from said second tomographic images;

measuring shift amount between said first projection image and said second projection image by searching said second projection image for the same area as a template, said template being generated from said first projection image such that said template includes an area in which a specific object image exists;

correcting the slice position according to said shift amount between said first projection image and said second projection image;

displaying said diagnostic image and said comparison image at a corrected slice position to a monitor; and adjusting positions of said diagnostic image and said comparison image which are displayed;

wherein a MIDI signal constructing method is used for the adjusting step, said MIDI signal constructing method comprising the steps of:

providing n different MIDI channels or control numbers or combinations of them for a signal x which has 128×n stages in which n is a positive integer;

assuming said MIDI channels or said control numbers or said combinations as p=1,2, . . . n;

dividing said signal x into 128 parts W(1) (1; $0 \leq 1 \leq 127$) in ascending order and assigning p which is equal to r+1 (r; $0 \leq 1 < n$) to said signal x which is equal to 1×n+r; and constructing and sending a MIDI control change message in which a control value is 1 by using a MIDI channel or control number corresponding to p.

10. An image alignment method for extracting a comparison image corresponding to a diagnostic image and displaying the images, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said method comprising the steps of:

inputting said first tomographic images and said second tomographic images;

aligning resolutions of said first tomographic images and said second tomographic images by scaling one or both of said tomographic images when the resolutions of said first tomographic images and said second tomographic images are different;

generating a first projection image of the X axial direction from said first tomographic images and generating a second projection image of the X axial direction from said second tomographic images;

measuring shift amount between said first projection image and said second projection image by searching said second projection image for the same area as a template by performing pattern matching while shifting said template by an interval, said template being generated from said first projection image such that said template includes an area in which a specific object image exists;

correcting the slice position according to said shift amount between said first projection image and said second projection image; and displaying said diagnostic image and said comparison image at a corrected slice position to a monitor;

wherein the first projection image and the second projection image are used to find a comparison image whose slice position corresponds to a slice position of a diagnostic image, so that the corrected slice position is used to find a corresponding slice position.

11. The image alignment method as claimed in claim 10, said method further comprising the step of finding a reference position in the Y axial direction for the projection images or for the tomographic images and correcting shift in the Y axial direction on the basis of said reference position.

12. The method of claim 10, further comprising:
adjusting positions of said diagnostic image and said comparison image which are displayed by providing a MIDI signal.

13. The method of claim 10, further comprising:
adjusting positions of said diagnostic image and said comparison image which are displayed, wherein the adjusting includes constructing a MIDI signal by:
providing different MIDI channels or control numbers or combinations of them for a signal;
dividing said signal into a number of parts and assigning a number to said signal; and
constructing a MIDI control change message by using a MIDI channel or a control number.

14. The method of claim 10, further comprising:
adjusting positions of said diagnostic image and said comparison image which are displayed, wherein the adjusting includes constructing a MIDI signal by:
providing n different MIDI channels or control numbers or combinations of them for a signal x;
assuming said MIDI channels or said control numbers or said combinations as p=1, 2, ... n;
dividing said signal x into a number of parts and assigning p to said signal x; and
constructing a MIDI control change message by using a MIDI channel or a control number corresponding to p.

15. A slice image automatic alignment method for extracting a comparison image corresponding to a diagnostic image, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said method comprising the steps of:

inputting said first tomographic images and said second tomographic images;

aligning resolutions of said first tomographic images and said second tomographic images by scaling one or both of said tomographic images when the resolutions of said first tomographic images and said second tomographic images are different;

generating a first projection image from said first tomographic images and a second projection image from said second tomographic images, wherein the direction of projection for generating each of said first and second projection images is perpendicular to the Z axial direction;

measuring shift amount between said first projection image and said second projection image by searching said second projection image for the same area as a template by performing pattern matching while shifting said template by an interval, said template being generated from said first projection image such that said template includes an area in which a specific object image exists; and correcting the slice position according to said shift amount between said first projection image and said second projection image;

wherein the first projection image and the second projection image are used to find a comparison image whose slice position corresponds to a slice position of a diagnostic image, so that the corrected slice position is used to find a corresponding slice position.

16. The slice image automatic alignment method as claimed in claim 15, the step of generating projection images including the step of:

generating said projection image comprising pixel values obtained by adding pixel values of said tomographic images in the X or Y axial direction or in any other direction.

17. The slice image automatic alignment method as claimed in claim 15, the step of generating projection images including the step of:

generating a two dimensional image sequence comprising pixel values obtained by adding pixel values of said tomographic images in the X or Y axial direction or in any other direction; and generating said projection image by interpolating said two dimensional image sequence.

18. The slice image automatic alignment method as claimed in claim 15, wherein said template is an area of 25% to 50% from the top end of said first projection image in the Z axial direction.

19. The slice image automatic alignment method as claimed in claim 15, the step of generating projection images including the step of generating said projection image in which weight is assignment to a specific observation object by setting a window level and a window width.

20. The slice image automatic alignment method as claimed in claim 15, the step of generating projection images including the step of generating said projection image in which only a part including a distinctive part is projected.

21. The slice image automatic alignment method as claimed in class 15, the step of measuring said shift amount including the steps of:

generating a plurality of templates;

performing template matching on said second projection image by said plurality of templates; and measuring shift amount between said first projection image and said second projection image from a plurality of reference points.

22. The method of claim 15, further comprising:
adjusting positions of said diagnostic image and said comparison image by providing a MIDI signal.

23. The method of claim 15, further comprising:
adjusting positions of said diagnostic image and said comparison image, wherein the adjusting includes constructing a MDI signal by:

providing different MIDI channels or control numbers or combinations of them for a signal;

dividing said signal into a number of parts and assigning a number to said signal; and constructing a MIDI control change message by using a MIDI channel or a control number.

24. The method of claim 15, further comprising:

adjusting positions of said diagnostic image and said comparison image, wherein the adjusting includes constructing a MIDI signal by:

providing n different MIDI channels or control numbers or combinations of them for a signal x;

assuming said MIDI channels or said control numbers or said combinations as p=1, 2, . . . n;

dividing said signal x into a number of parts and assigning p to said signal x; and constructing a MIDI control change message by using a MIDI channel or a control number corresponding to p.

25. A slice image automatic alignment method for extracting a comparison image corresponding to a diagnostic image, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said method comprising the steps of:

inputting said first tomographic images and said second tomographic images;

aligning resolutions of said first tomographic images and said second tomographic images by scaling one or both of said tomographic images when the resolutions of said first tomographic images and said second tomographic images are different;

generating a first projection image of the X axial direction from said first tomographic images and generating a second projection image of the X axial direction from said second tomographic images;

measuring shift amount between said first projection image and said second projection image by searching said second projection image for the same area as a template by performing pattern matching while shifting said template by an interval, said template being generated from said first projection image such that said template includes an area in which a specific object image exists; and connecting the slice position according to said shift amount between said first projection image and said second projection image;

wherein the first projection image and the second projection image are used to find a comparison image whose slice position corresponds to a slice position of a diagnostic image so that the corrected slice position is used to find a corresponding slice position.

26. The slice image automatic alignment method as claimed in claim 25, the step of generating projection images including the step of:

generating a two dimensional image sequence comprising pixel values obtained by adding pixel values of said tomographic images in the X axial direction; and generating said projection image by interpolating said two dimensional image sequence.

27. The slice image automatic alignment method as claimed in claim 25, the step of finding said reference position and correcting shift including the steps of:

extracting a bed area as said reference position from said first tomographic image and said second tomographic image or said first projection image and said second projection image;

correcting shift in the Y axial direction on the basis of the bed surface, said Y axial direction being perpendicular to said bed surface.

28. The slice image automatic alignment method as claimed in claim 25, the step of finding said reference position and correcting shift including the steps of:

finding a body part which contacts the bed as said reference position from said first tomographic image and said second tomographic image or said first projection image and said second projection image;

correcting shift in the Y axial direction on the basis of said part, said Y axial direction being perpendicular to said part.

29. The slice image automatic alignment method as claimed in claim 25, the step of finding said reference position and correcting shift including the steps of:

finding a backbone part as said reference position from said first tomographic image and said second tomographic image or said first projection image and said second projection image;

correcting shift in the Y axial direction on the basis of said backbone part, said Y axial direction being perpendicular to said backbone part.

30. The slice image automatic alignment method as claimed in claim 25, the step of generating projection images including the step of generating said projection image in which weight is assignment to a specific observation object by setting a window level and a window width.

31. The slice image automatic alignment method as claimed in class 25, the step of generating projection images including the step of generating said projection image in which only a part including a distinctive part is projected.

32. The slice image automatic alignment method as claimed in claim 25, the step of measuring said shift amount including the steps of:

generating a plurality of templates;

performing template matching on said second projection image by said plurality of templates; and measuring shift amount between said first projection image and said second projection image from a plurality of reference points.

33. The slice image automatic alignment method as claimed in claim 25, wherein said template is an area of 25% to 50% from the top end of said first projection image in the Z axial direction.

34. The slice image automatic alignment method as claimed in claim 25, said method comprising the step of finding a reference position in the Y axial direction for the projection images or the tomographic images and correcting shift in the Y axial direction on the basis of said reference position.

35. The method of claim 25, further comprising:

adjusting positions of said diagnostic image and said comparison image by providing a MDI signal.

36. The method of claim 25, further comprising:

adjusting positions of said diagnostic image and said comparison image, wherein the adjusting includes constructing a MDI signal by:

providing different MDI channels or control numbers or combinations of them for a signal;

dividing said signal into a number of parts and assigning a number to said signal; and constructing a MIDI control change message by using a MIDI channel or a control number.

37. The method of claim 25, further comprising:
adjusting positions of said diagnostic image and said comparison image, wherein the adjusting includes constructing a MIDI signal by:
providing n different MIDI channels or control numbers or combinations of them for a signal x;
assuming said MIDI channels or said control numbers or said combinations as p=1,2, . . . n;
dividing said signal x into a number of parts and assigning p to said signal x; and
constructing a MIDI control change message by using a MDI channel or a control number corresponding to p.

38. A tomographic image reading apparatus for extracting a comparison image corresponding to a diagnostic image and displaying the images, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said apparatus comprising:
inputting means for inputting said first tomographic images and said second tomographic images;
projection image generation means for generating a first projection image from said first tomographic images and a second projection image from said second tomographic images, wherein the direction of projection for generating each of said first and second projection images is perpendicular to the Z axial direction;
template generation means for generating a template from said first projection image such that said template includes an area in which a specific object image exists;
matching means for measuring shift amount between said first projection image and said second projection image by searching said second projection image for the same area as said template;
slice position correcting means for correcting the slice position according to said shift amount between said first projection image and said second projection image; and
displaying means for displaying said diagnostic image and said comparison image at a corrected slice position to a monitor;
wherein the first projection image and the second projection image are used to find a comparison image whose slice position corresponds to a slice position of a diagnostic image, so that the corrected slice position is used to find a corresponding slice position.

39. The apparatus of claim 38, further comprising:
means for adjusting positions of said diagnostic image and said comparison image which are displayed by providing a MIDI signal.

40. The apparatus of claim 38, further comprising:
means for adjusting positions of said diagnostic image and said comparison image which are displayed, wherein the adjusting includes constructing a MIDI signal by:
providing different MIDI channels or control numbers or combinations of them for a signal;
dividing said signal into a number of parts and assigning a number to said signal; and
constructing a MDI control change message by using a MIDI channel or a control number.

41. The apparatus of claim 38, further comprising:
means for adjusting positions of said diagnostic image and said comparison image which are displayed, wherein the adjusting includes constructing a MIDI signal by:
providing n different MIDI channels or control numbers or combinations of them for a signal x;
assuming said MIDI channels or said control numbers or said combinations as p=1,2, . . . n;
dividing said signal x into a number of parts and assigning p to said signal x; and
constructing a MIDI control change message by using a MIDI channel or a control number corresponding to p.

42. An image alignment apparatus for extracting a comparison image corresponding to a diagnostic image and displaying the images, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said apparatus comprising:
inputting means for inputting said first tomographic images and said second tomographic images;
resolution aligning means for aligning resolutions of said first tomographic images and said second tomographic images by scaling one or both of said tomographic images when the resolutions of said first tomographic images and said second tomographic images are different;
projection image generation means for generating a first projection image from said first tomographic images and a second projection image from said second tomographic images, wherein the direction of projection for generating each of said first and second projection images is perpendicular to the Z axial direction;
template generation means for generating a template from said first projection image such that said template includes an area in which a specific object image exists;
matching means for measuring shift amount between said first projection image and said second projection image by searching said second projection image for the same area as said template by performing pattern matching while shifting said template by an interval;
slice position correcting means for correcting the slice position according to said shift amount between said first projection image and said second projection image; and
displaying means for displaying said diagnostic image and said comparison image at a corrected slice position to a monitor;
wherein the first projection image and the second projection image are used to find a comparison image whose slice position corresponds to a slice position of a diagnostic image, so that the corrected slice position is used to find a corresponding slice position.

43. The apparatus of claim 42, further comprising:
means for adjusting positions of said diagnostic image and said comparison image which are displayed by providing a MIDI signal.

44. The apparatus of claim 42, further comprising:
means for adjusting positions of said diagnostic image and said comparison image which are displayed, wherein the adjusting includes constructing a MDI signal by:
providing different MIDI channels or control numbers or combinations of them for a signal;
dividing said signal into a number of parts and assigning a number to said signal; and
constructing a MIDI control change message by using a MIDI channel or a control number.

45. The apparatus of claim 42, further comprising:
means for adjusting positions of said diagnostic image and said comparison image which are displayed, wherein the adjusting includes constructing a MIDI signal by:
providing n different MIDI channels or control numbers or combinations of them for a signal x;
assuming said MIDI channels or said control numbers or said combinations as p=1,2, . . . n;
dividing said signal x into a number of parts and assigning p to said signal x; and
constructing a MIDI control change message by using a MIDI channel or a control number corresponding to p.

46. An image alignment apparatus for extracting a comparison image corresponding to a diagnostic image and displaying the images, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said apparatus comprising:
inputting means for inputting said first tomographic images and said second tomographic images;
resolution aligning means for aligning resolutions of said first tomographic images and said second tomographic images by scaling ore or both of said tomographic images when the resolutions of said first tomographic images and said second tomographic images are different;
projection image generation means for generating a first projection image of the X axial direction from said first tomographic images and generating a second projection image of the X axial direction from said second tomographic images;
template generation means for generating a template from said first projection image such that said template includes an area in which a specific object image exists;
matching means for measuring shift amount between said first projection image and said second projection image by searching said second projection image for the same area as said template by performing pattern matching while shifting said template by an interval;
slice position correcting means for correcting the slice position according to said shift amount between said first projection image and said second projection image; and
displaying means for displaying said diagnostic image and said comparison image at a corrected slice position to a monitor;
wherein the first projection image and the second projection image are used to find a comparison image whose slice position corresponds to a slice position of a diagnostic image, so that the corrected slice position is used to find a corresponding slice position.

47. The image alignment apparatus as claimed in claim 46, said apparatus further comprising:
reference position recognition means for finding a reference position in the Y axial direction for the tomographic images or the projection images; and
shift correcting means for correcting shift in the Y axial direction on the basis of said reference position.

48. The apparatus of claim 46, further comprising:
means for adjusting positions of said diagnostic image and said comparison image which are displayed by providing a MIDI signal.

49. The apparatus of claim 46, further comprising:
means for adjusting positions of said diagnostic image and said comparison image which are displayed, wherein the adjusting includes constructing a MIDI signal by:
providing different MIDI channels or control numbers or combinations of them for a signal;
dividing said signal into a number of parts and assigning a number to said signal; and
constructing a MIDI control change message by using a MIDI channel or a control number.

50. The apparatus of claim 46, further comprising:
means for adjusting positions of said diagnostic image and said comparison image which are displayed, wherein the adjusting includes constructing a MIDI signal by:
providing n different MIDI channels or control numbers or combinations of them for a signal x;
assuming said MIDI channels or said control numbers or said combinations as p=1, 2, . . . n;
dividing said signal x into a n umber of parts and assigning p to said signal x; and
constructing a MIDI control change message by using a MIDI channel or a control number corresponding to p.

51. A slice image automatic alignment apparatus for extracting a comparison image corresponding to a diagnostic image, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said apparatus comprising:
inputting means for inputting said first tomographic images and said second tomographic images;
resolution aligning means for aligning resolutions of said first tomographic images and said second tomographic images by scaling one or both of said tomographic images when the resolutions of said first tomographic images and said second tomographic images are different;
projection image generation means for generating a first projection image from said first tomographic images and a second projection image from said second tomographic images, wherein the direction of projection for generating each of said first and second projection images is perpendicular to the Z axial direction;
template generation means for generating a template from said first projection image such that said template includes an area in which a specific object image exists;
matching means for measuring shift amount between said first projection image and said second projection image by searching said second projection image for the same area as said template by performing pattern matching while shifting said template by an interval; and slice position correcting means for correcting the slice position according to said shift amount between said first projection image and said second projection image;

wherein the first projection image and the second projection image are used to find a comparison image whose slice position corresponds to a slice position of a diagnostic image, so that the corrected slice position is used to find a corresponding slice position.

52. The apparatus of claim 51, further comprising:

means for adjusting positions of said diagnostic image and said comparison image by providing a MIDI signal.

53. The apparatus of claim 51, further comprising:

means for adjusting positions of said diagnostic image and said comparison image, wherein the adjusting includes constructing a MIDI signal by:
providing different MIDI channels or control numbers or combinations of them for a signal;
dividing said signal into a number of parts and assigning a number to said signal; and
constructing a MIDI control change message by using a MIDI channel or a control number.

54. The apparatus of claim 51, further comprising:

means for adjusting positions of said diagnostic image and said comparison image, wherein the adjusting includes constructing a MIDI signal by:
providing n different MIDI channels or control numbers or combinations of them for a signal x;
assuming said MIDI channels or said control numbers or said combinations as p=1,2, . . . n;
dividing said signal x into a number of parts and assigning p to said signal x; and
constructing a MDI control change message by using a MIDI channel or a control number corresponding to p.

55. A slice image automatic alignment apparatus for extracting a comparison image corresponding to a diagnostic image, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said apparatus comprising:

inputting means for inputting said first tomographic images and said second tomographic images;

resolution aligning means for aligning resolutions of said first tomographic images and said second tomographic images by scaling one or both of said tomographic images when the resolutions of said first tomographic images and said second tomographic images are different;

projection image generation means for generating a first projection image of the X axial direction from said first tomographic images and generating a second projection image of the X axial direction from, said second tomographic images;

template generation means for generating a template from said first projection image such that said template includes an area in which a specific object image exists;

matching means for measuring shift amount between said first projection image and said second projection image by searching said second projection image for the same area as said template by performing pattern matching while shifting said template by an interval; and slice position correcting means for correcting the slice position according to said shift amount between said first projection image and said second projection image;

wherein the first projection image and the second projection image are used to find a comparison image whose slice position corresponds to a slice position of a diagnostic image, so that the corrected slice position is used to find a corresponding slice position.

56. The slice image automatic alignment apparatus as claimed in claim 55, said apparatus further comprising:

reference position recognition means for finding a reference position in the Y axial direction for the tomographic images or the projection images; and shift correcting means for correcting shift in the Y axial direction on the basis of said reference position.

57. The apparatus of claim 55, further comprising:

means for adjusting positions of said diagnostic image and said comparison image by providing a MIDI signal.

58. The apparatus of claim 55, further comprising:

means for adjusting positions of said diagnostic image and said comparison image, wherein the adjusting includes constructing a MIDI signal by:
providing different MIDI channels or control numbers or combinations of them for a signal;
dividing said signal into a number of parts and assigning a number to said signal; and
constructing a MIDI control change message by using a MIDI channel or a control number.

59. The apparatus of claim 55, further comprising:

means for adjusting positions of said diagnostic image and said comparison image, wherein the adjusting includes constructing a MIDI signal by:
providing n different MIDI channels or control numbers or combinations of them for a signal x;
assuming said MIDI channels or said control numbers or said combinations as p=1,2, . . . n;
dividing said signal x into a number of parts and assigning p to said signal x; and
constructing a MIDI control change message by using a MIDI channel or a control number corresponding to p.

60. A computer readable medium storing program code for causing a computer to extract a comparison image corresponding to a diagnostic image and to display the images, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said computer readable medium comprising:

program code means for inputting said first tomographic images and said second tomographic images;

program code means for generating a first projection image from said first tomographic images and a second projection image from said second tomographic images, wherein the direction of projection for generating each of said first and second projection images is perpendicular to the Z axial direction;

program code means for measuring shift amount between said first projection image and said second projection image by searching said second projection image for the same area as a template, said template being generated from said first projection image such that said template includes an area in which a specific object image exists;

program code means for correcting the slice position according to said shift amount between said first projection image and said second projection image; and program code means for displaying said diagnostic image and said comparison image at a corrected slice position to a monitor;

wherein the first projection image and the second projection image are used to find a comparison image whose slice position corresponds to a slice position of a diagnostic image, so that the corrected slice position is used to find a corresponding slice position.

61. The computer readable medium of claim 60, further comprising:

program code means for adjusting positions of said diagnostic image and said comparison image which are displayed by providing a MIDI signal.

62. The computer readable medium of claim 60, further comprising:

program code means for adjusting positions of said diagnostic image and said comparison image which are displayed, wherein the adjusting includes constructing a MIDI signal by:

providing different MIDI channels or control numbers or combinations of them for a signal;

dividing said signal into a number of parts and assigning a number to said signal; and constructing a MIDI control change message by using a MIDI channel or a control number.

63. The computer readable medium of claim 60, further comprising:

program code means for adjusting positions of said diagnostic image and said comparison image which are displayed, wherein the adjusting includes constructing a MIDI signal by:

providing n different MIDI channels or control numbers or combinations of them for a signal x;

assuming said MIDI channels or said control numbers or said combinations as p=1, 2, . . . n;

dividing said signal x into a n umber of parts and assigning p to said signal x; and constructing a MIDI control change message by using a MIDI channel or a control number corresponding to p.

64. A computer readable medium storing program code for causing a computer to extract a comparison image corresponding to a diagnostic image and to display the images, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said computer readable medium comprising:

program code means for inputting said first tomographic images and said second tomographic images;

program code means for aligning resolutions of said first tomographic images and said second tomographic images by scaling one or both of said tomographic images when the resolutions of said first tomographic images and said second tomographic images are different;

program code means for generating a first projection image from said first tomographic images and a second projection image from said second tomographic images, wherein the direction of projection for generating each of said first and second projection images is perpendicular to the Z axial direction;

program code means for measuring shift amount between said first projection image and said second projection image by searching said second projection image for the same area as a template by performing pattern matching while shifting said template by an interval, said template being generated from said first projection image such that said template includes an area in which a specific object image exists;

program code means for correcting the slice position according to said shift amount between said first projection image and said second projection image; and program code means for displaying said diagnostic image and said comparison image at a corrected slice position to a monitor;

wherein the first projection image and the second projection image are used to find a comparison image whose slice position corresponds to a slice position of a diagnostic image, so that the corrected slice position is used to find a corresponding slice position.

65. The computer readable medium of claim 64, further comprising:

program code means for adjusting positions of said diagnostic image and said comparison image which are displayed by providing a MIDI signal.

66. The computer readable medium of claim 64, further comprising:

program code means for adjusting positions of said diagnostic image and said comparison image which are displayed, wherein the adjusting includes constructing a MIDI signal by:

providing different MIDI channels or control numbers or combinations of them for a signal;

dividing said signal into a number of parts and assigning a number to said signal; and constructing a MIDI control change message by using a MDI channel or a control number.

67. The computer readable medium of claim 64, further comprising:

program code means for adjusting positions of said diagnostic image and said comparison image which are displayed, wherein the adjusting includes constructing a MIDI signal by:

providing n different MIDI channels or control numbers or combinations of them for a signal x;

assuming said MDI channels or said control numbers or said combinations as p=1,2, . . . n;

dividing said signal x into a n umber of parts and assigning p to said signal x; and constructing a MIDI control change message by using a MIDI channel or a control number corresponding to p.

68. A computer readable medium storing program code for causing a computer to extract a comparison image corresponding to a diagnostic image and to display the images, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said computer readable medium comprising:

program code means for inputting said first tomographic images and said second tomographic images;

program code means for aligning resolutions of said first tomographic images and said second tomographic images by scaling one or both of said tomographic images when the resolutions of said first tomographic images and said second tomographic images are different;

program code means for generating a first projection image from said first tomographic images and a second projection image from said second tomographic images;

program code means for measuring shift amount between said first projection image and said second projection image by searching said second projection image for the same area as a template by performing pattern matching while shifting said template by an interval, said template being generated from said first projection image such that said template includes an area in which a specific object image exists;

program code means for correcting the slice position according to said shift amount between said first projection image and said second projection image;

program code means for displaying said diagnostic image and said comparison image at a corrected slice position to a monitor; and adjusting program code means for adjusting positions of said diagnostic image and said comparison image which are displayed;

wherein a MIDI signal constructing program code means is used for adjusting program code means, said MIDI signal constructing program code means including:

program code means for providing n different MIDI channels or control numbers or combinations of them for a signal x which has 128×n stages in which n is a positive integer;

program code means for assuming said MIDI channels or said control numbers or said combinations as p=1,2, . . . n;

program code means for dividing said signal x into 128 parts W(1) (1; $0 \leq 1 \leq 127$) in ascending order and assigning p which is equal to r+1 (r; $0 \leq r < n$) to said signal x which is equal to 1×n+r; and program code means for constructing and sending a MIDI control change message in which a control value is 1 by using a MIDI channel or control number corresponding to p.

69. A computer readable medium storing program code for causing a computer to extract a comparison image corresponding to a diagnostic image, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said computer readable medium comprising:

program code means for inputting said first tomographic images and said second tomographic images;

program code means for aligning resolutions of said first tomographic images and said second tomographic images by scaling one or both of said tomographic images when the resolutions of said first tomographic images and said second tomographic images are different;

program code means for generating a first projection image from said first tomographic images and a second projection image from said second tomographic images, wherein the direction of projection for generating each of said first and second projection images is perpendicular to the Z axial direction;

program code means for measuring shift amount between said first projection image and said second projection image by searching said second projection image for the same area as a template by performing pattern matching while shifting said template by an interval, said template, being generated from said first projection image such that said template includes an area in which a specific object image exists; and program code means for correcting the slice position according to said shift amount between said first projection image and said second projection image;

wherein the first projection image and the second projection image are used to find a comparison image whose slice position corresponds to a slice position of a diagnostic image, so that the corrected slice position is used to find a corresponding slice position.

70. The computer readable medium as claimed in claim 69, said program code means for generating said projection images comprising:

program code means for generating said projection image comprising pixel values obtained by adding pixel values of said tomographic images in the X or Y axial direction or in any other direction.

71. The computer readable medium as claimed in claim 69, said program code means for generating said projection images comprising:

program code means for generating a two dimensional image sequence comprising pixel values obtained by adding pixel values of said tomographic images in the X or Y axial direction or in any other direction; and generating said projection image by interpolating said two dimensional image sequence.

72. The computer readable medium as claimed in claim 69, wherein said template is an area of 25% to 50% from the top end of said first projection image in the Z axial direction.

73. The computer readable medium as claimed in claim 69, said program code means for generating said projection images comprising program code means for generating said projection image in which weight is assigned to a specific observation objection by setting a window level and a window width.

74. The computer readable medium as claimed in claim 69, said program code means for generating said projection images comprising program code means for generating said projection image in which only a part including a distinctive part is projected.

75. The computer readable medium as claimed in claim 69, said program code means for measuring said shift amount comprising:

program code means for generating a plurality of templates;

program code means for performing template matching on said second projection image by said plurality of templates; and program code means for measuring shift amount between said first projection image from a plurality of reference points.

76. The computer readable medium of claim 69, further comprising:

program code means for adjusting positions of said diagnostic image and said comparison image by providing a MIDI signal.

77. The computer readable medium of claim 69, further comprising:
  program code means for adjusting positions of said diagnostic image and said comparison image, wherein the adjusting includes constructing a MIDI signal by:
    providing different MDI channels or control numbers or combinations of them for a signal;
    dividing said signal into a number of parts and assigning a number to said signal; and
    constructing a MIDI control change message by using a MIDI channel or a control number.

78. The computer readable medium of claim 69, further comprising:
  program means for adjusting positions of said diagnostic image and said comparison image, wherein the adjusting includes constructing a MIDI signal by:
    providing n different MIDI channels or control numbers or combinations of them for a signal x;
    assuming said MIDI channels or said control numbers or said combinations as p=1,2, . . . n;
    dividing said signal x into a n umber of parts and assigning p to said signal x; and
    constructing a MIDI control change message by using a MIDI channel or a control number corresponding to p.

79. A computer readable medium storing program code for causing a computer to extract a comparison image corresponding to a diagnostic image, said diagnostic image being a slice image which is one of first tomographic images, said comparison image being a slice image which is one of second tomographic images which are taken at the time different from the time when the first tomographic images are taken, body section being a slice plane in the X-Y axial direction and body axis being in the Z axial direction, said computer readable medium comprising:
  program code means for inputting said first tomographic images and said second tomographic images;
  program code means for aligning resolutions of said first tomographic images and said second tomographic images by scaling one or both of said tomographic images when the resolutions of said first tomographic images and said second tomographic images are different;
  program code means for generating a first projection image of the X axial direction from said first tomographic images and generating a second projection image of the X axial direction from said second tomographic images;
  program code means for measuring shift amount between said first projection image and said second projection image by searching said second projection image for the same area as a template by performing pattern matching while shifting said template by an interval, said template being generated from said first projection image such that said template includes an area in which a specific object image exists; and
  program code means for correcting the slice position according to said shift amount between said first projection image and said second projection image;
  wherein the first projection image and the second projection image are used to find a comparison image whose slice position corresponds to a slice position of a diagnostic image, so that the corrected slice position is used to find a corresponding slice position.

80. The computer readable medium as claimed in claim 79, said program code means for generating said projection images comprising:
  program code means for generating a two dimensional image sequence comprising pixel values obtained by adding pixel values of said tomographic images in the X axial direction; and
  program code means for generating said projection image by interpolating said two dimensional image sequence.

81. The computer readable medium as claimed in claim 79, said program code means for finding said reference position and correcting shift comprising:
  program code means for extracting a bed area as said reference position from said first tomographic image and said second tomographic image or said first projection image and said second projection image;
  program code means for correcting shift in the Y axial direction on the basis of the bed surface, said Y axial direction being perpendicular to said bed surface.

82. The computer readable medium as claimed in claim 79, said program code means for finding said reference position and correcting shift comprising:
  program code means for finding a body part which contacts the bed as said reference position from said first tomographic image and said second tomographic image or said first projection image and said second projection image;
  program code means for correcting shift in the Y axial direction on the basis of said part, said Y axial direction being perpendicular to said part.

83. The computer readable medium as claimed in claim 79, said program code means for finding said reference position and correcting shift comprising:
  program code means for finding a backbone part as said reference position from said first tomographic image and said second tomographic image or said first projection image and said second projection image;
  program code means for correcting shift in the Y axial direction on the basis of said-backbone part, said Y axial direction being perpendicular to said backbone part.

84. The computer readable medium as claimed in claim 79, said program code means for generating said projection images comprising program code means for generating said projection image in which weight is assignment to a specific observation object by setting a window level and a window width.

85. The computer readable medium as claimed in claim 79, said program code means for generating said projection images comprising program code means for generating said projection image in which only a part including a distinctive part is projected.

86. The computer readable medium as claimed in claim 79, said program code means for measuring said shift amount comprising:
  program code means for generating a plurality of templates;
  program code means for performing templates matching on said second projection image by said plurality of templates; and
  program code means for measuring shift amount between said first projection image and said second projection image from a plurality of reference points.

87. The computer readable medium as claimed in claim 79, said computer readable medium further comprising:
  program code means for finding a reference position in the Y axial direction for the tomographic images or the projection images and correcting shift in the Y axial direction on the basis of said reference position.

88. The computer readable medium of claim 79, further comprising:

program code means for adjusting positions of said diagnostic image and said comparison image by providing a MIDI signal.

89. The computer readable medium of claim 79, further comprising:

program code means for adjusting positions of said diagnostic image and said comparison image, wherein the adjusting includes constructing a MIDI signal by:
providing different MIDI channels or control numbers or combinations of them for a signal;
dividing said signal into a number of parts and assigning a number to said signal; and
constructing a MIDI control change message by using a MIDI channel or a control number.

90. The computer readable medium of claim 79, further comprising:

program means for adjusting positions of said diagnostic image and said comparison image, wherein the adjusting includes constructing a MIDI signal by:
providing n different MIDI channels or control numbers or combinations of them for a signal x;
assuming said MIDI channels or said control numbers or said combinations as p=1, 2, . . . n;
dividing said signal x into a number of parts and assigning p to said signal x; and
constructing a MIDI control change message by using a MIDI channel or a control number corresponding to p.

\* \* \* \* \*

UNITED STATES PATENT AND TRADEMARK OFFICE
CERTIFICATE OF CORRECTION

PATENT NO. : 6,904,163 B1
DATED : June 7, 2005
INVENTOR(S) : Kaori Fujimura et al.

It is certified that error appears in the above-identified patent and that said Letters Patent is hereby corrected as shown below:

Column 6,
Line 10, change "may includes" to -- may include --.

Column 17,
Line 11, change "an configuration" to -- a configuration --.

Column 26,
Line 52, change "class 15" to -- claim 15 --.

Column 28,
Line 35, change "class 25" to -- claim 25 --.

Signed and Sealed this

Twenty-seventh Day of September, 2005

JON W. DUDAS
*Director of the United States Patent and Trademark Office*